(12) United States Patent
Wong et al.

(10) Patent No.: US 12,399,909 B2
(45) Date of Patent: Aug. 26, 2025

(54) CONFIGURATION AND MANAGEMENT OF REPLICATION UNITS FOR ASYNCHRONOUS DATABASE TRANSACTION REPLICATION

(71) Applicant: Oracle International Corporation, Redwood Shores, CA (US)

(72) Inventors: Lik Wong, Palo Alto, CA (US); Leonid Novak, Castro Valley, CA (US); Sampanna Salunke, San Carlos, CA (US); Mark Dilman, Sunnyvale, CA (US); Wei-Ming Hu, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/372,005

(22) Filed: Sep. 22, 2023

(65) Prior Publication Data

US 2024/0126782 A1 Apr. 18, 2024

Related U.S. Application Data

(60) Provisional application No. 63/415,466, filed on Oct. 12, 2022.

(51) Int. Cl.
*G06F 16/27* (2019.01)
*G06F 11/14* (2006.01)
(Continued)

(52) U.S. Cl.
CPC ........ *G06F 16/273* (2019.01); *G06F 11/1469* (2013.01); *G06F 16/2282* (2019.01);
(Continued)

(58) Field of Classification Search
CPC ............ G06F 16/2379; G06F 16/2282; G06F 11/1469; G06F 16/278; G06F 16/273;
(Continued)

(56) References Cited

U.S. PATENT DOCUMENTS 10,936,573 B2 * 3/2021 Ducott, III .......... G06F 21/6218
11,119,872 B1 9/2021 Jacobson
(Continued)

FOREIGN PATENT DOCUMENTS

| EP | 1876788 A1 | 1/2008 |
|---|---|---|
| EP | 3182300 A1 | 6/2017 |
| WO | WO 2021/021757 A1 | 2/2021 |

OTHER PUBLICATIONS

Ongaro et al., "In Search of an Understandable Consensus Algorithm", Jun. 19, 2014, pp. 1-16.
(Continued)

*Primary Examiner* — Huawen A Peng
(74) *Attorney, Agent, or Firm* — Hickman Becker Bingham Ledesma LLP

(57) ABSTRACT

A consensus protocol-based replication approach is provided. Chunks are grouped into replication units (RUs) to optimize replication efficiency. Chunks may be assigned to RUs based on load and replication throughput. Splitting and merging RUs do not interrupt concurrent user workload or require routing changes. Transactions spanning chunks within an RU do not require distributed transaction processing. Each replication unit has a replication factor (RF), which refers to the number of copies/replicas of the replication unit, and an associated distribution factor (DF), which refers to the number of servers taking over the workload from a failed leader server. RUs may be placed in rings of servers, where the number of servers in a ring is equal to the
(Continued)

replication factor, and quiescing the workload can be restricted to a ring of servers instead of the entire database.

20 Claims, 13 Drawing Sheets

(51) Int. Cl.
*G06F 16/22* (2019.01)
*G06F 16/23* (2019.01)
(52) U.S. Cl.
CPC ...... *G06F 16/2343* (2019.01); *G06F 16/2379* (2019.01); *G06F 2201/80* (2013.01)
(58) Field of Classification Search
CPC .. G06F 11/1474; G06F 2201/80; G06F 16/27; G06F 16/2343
See application file for complete search history.

(56) References Cited

U.S. PATENT DOCUMENTS

| | | | |
|---|---|---|---|
| 11,671,488 B1 | 6/2023 | Sharma | |
| 2004/0243558 A1* | 12/2004 | Nelson | G06F 9/466 |
| 2005/0165858 A1 | 7/2005 | Tom et al. | |
| 2010/0145909 A1* | 6/2010 | Ngo | G06F 11/2097 |
| | | | 707/611 |
| 2013/0006933 A1* | 1/2013 | Holden | G06F 16/27 |
| | | | 707/634 |
| 2013/0290249 A1 | 10/2013 | Merriman et al. | |
| 2014/0337529 A1* | 11/2014 | Antony | H04L 41/0897 |
| | | | 709/226 |
| 2016/0371358 A1 | 12/2016 | Lee | |
| 2017/0103092 A1 | 4/2017 | Hu et al. | |
| 2018/0260125 A1 | 9/2018 | Botes | |
| 2019/0155705 A1 | 5/2019 | Chavan | |
| 2019/0163545 A1 | 5/2019 | Singh et al. | |
| 2019/0325055 A1 | 10/2019 | Lee et al. | |
| 2020/0034257 A1 | 1/2020 | Mahmood et al. | |
| 2020/0042410 A1 | 2/2020 | Gupta | |
| 2020/0364239 A1 | 11/2020 | Kumar | |
| 2022/0100710 A1 | 3/2022 | Camargos et al. | |
| 2022/0114058 A1 | 4/2022 | Mylavarapu et al. | |
| 2022/0114164 A1 | 4/2022 | Krishnaswamy et al. | |
| 2022/0206900 A1 | 6/2022 | Zad Tootaghaj | |
| 2022/0334923 A1* | 10/2022 | Bent | G06F 11/3034 |
| 2022/0358118 A1 | 11/2022 | Paluch | |
| 2024/0012575 A1 | 1/2024 | Narasingarayanapeta | |
| 2024/0036732 A1 | 2/2024 | Vijayan | |
| 2024/0036996 A1 | 2/2024 | Vijayan | |
| 2024/0036997 A1 | 2/2024 | Vijayan | |
| 2024/0045887 A1 | 2/2024 | VanBenschoten | |
| 2024/0143554 A1 | 5/2024 | Kaushik | |
| 2024/0256391 A1 | 8/2024 | Shetty | |
| 2024/0256405 A1 | 8/2024 | Shetty | |
| 2024/0273077 A1 | 8/2024 | Zeng | |

OTHER PUBLICATIONS

Cao et al., "PolarDB-X: An Elastic Distributed Relational Database for Cloud-Native Applications", 2022 IEEE 38th ICDE, pp. 1-14.
Wong, U.S. Appl. No. 18/805,383, filed Aug. 14, 2024, Non-Final Rejection.
Wong, U.S. Appl. No. 18/372,006, filed Sep. 22, 2023, Notice of Allowance and Fees Due.
Wong, U.S. Appl. No. 18/372,002, filed Sep. 22, 2023, Notice of Allowance and Fees Due.
Novak, U.S. Appl. No. 18/227,288, filed Jul. 27, 2023, Notice of Allowance and Fees Due.

* cited by examiner

CONFIGURATION AND MANAGEMENT OF REPLICATION UNITS FOR ASYNCHRONOUS DATABASE TRANSACTION REPLICATION

CROSS-REFERENCE TO RELATED APPLICATIONS; BENEFIT CLAIM

This application claims the benefit of Provisional Application 63/415,466, filed Oct. 12, 2022, the entire contents of which are hereby incorporated by reference as if fully set forth herein, under 35 U.S.C. § 119(e).

FIELD OF THE INVENTION

The present invention relates to asynchronous database transaction replication with fast, automatic failover, zero data loss, strong consistency, full SQL support, and horizontal scalability using a consensus protocol.

BACKGROUND

Consensus protocols allow a collection of machines to work as a coherent group that can survive the failures of some of its members. Because of this, variations of consensus protocols play a key role in large-scale software systems, such as replicated database systems. Raft is a consensus protocol that is designed to be understandable and straightforward to implement. Raft offers a generic way to distribute a state machine across a cluster of computing nodes, referred to herein as simply "nodes" or "participant nodes," ensuring that each node in the cluster agrees upon the same series of state transitions. The replicated state machines are typically implemented using a replicated log. Each node stores a log replica containing a series of commands, which its state machine executes in order; thus, each state machine processes the same sequence of commands. Since the state machines are deterministic, each computes the same state and the same sequence of outputs.

Sharding is a database scaling technique based on horizontal partitioning of data across multiple independent physical databases. Each physical database in such a configuration is called a "shard."

Sharding relies on replication for availability. Database sharding customers often require a high performance, low overhead replication that gives strong consistency, supports fast failover with zero data loss, and full Structured Query Language (SQL) and relational transactions. The replication must support virtually unlimited horizontal scalability and symmetric shards with balanced utilization of each shard. There are Raft implementations for database replication to attempt to address the above requirements, such as the MongoDB® database system, Cloud Spanner™ cloud software, the CockRoachDB™ database system, YugabyteDB, and TiDB.

Current replication solutions for sharding meet many of these requirements. However, none of them meet all the requirements. For example, Logical Standby can support 1-2 second failover; however, multiple databases must be configured per physical server to balance the load, and more shards must be used to keep up with the primary shard's workload. Active Data Guard and Logical Standby are active/passive replication strategies at shard level that have idle hardware. GoldenGate™ does not support automatic fast failover in a sharded database.

A typical NoSQL database, such as Cassandra™, Amazon® DynamoDB™, meets many of the above requirements, such as horizontal scalability, simplicity, symmetric shards; however, they lack SQL support, ACID (Atomicity, Consistency, Isolation, and Durability) transactions, and strong consistency. Some NewSQL databases, such as Cloud Spanner™, CockRoachDB™, YugabyteDB™, TiDB™, provide SQL support and implement a consensus-based replication (Paxos or Raft), which supports strong consistency. They typically implement synchronous database replications, which increases user transaction response time. YugabyteDB™ claims that it applies changes to a follower asynchronously for certain cases, e.g., single-key DMLs. However, YugabyteDB™ may still need synchronization to present a global time for transactions.

Kafka™ is a well-known messaging system and meets many of the above requirements, but Kafka™ is non-relational. Raft-based Replication (RR) does not require persistent memory, RR adds logical logging on top of physical redo logs, RR supports full SQL, and RR can more readily tolerate geographically remote replicas.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

Figure 1:
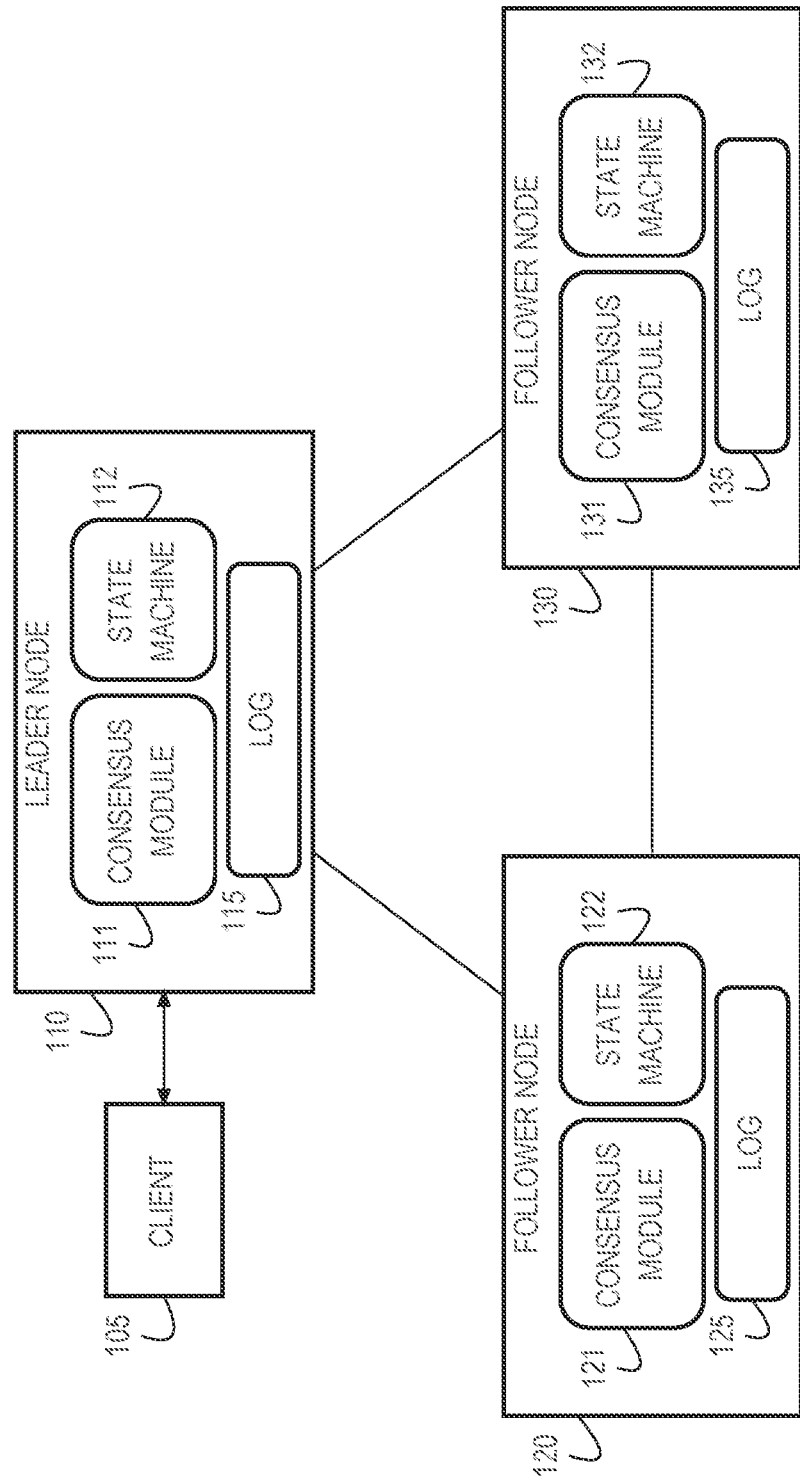
FIG. 1 is a block diagram illustrating a distributed computing system with a state machine and log replicated across a plurality of computing nodes in accordance with a consensus protocol in which aspects of the illustrative embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments provide asynchronous database transaction replication based on log replication.

In accordance with illustrative embodiments, a leader server receives a command to perform a change operation on a row of a table of a database. The table is replicated on a replication group of servers such that each server within the replication group of servers stores a respective copy of the row of the table. The replication group of servers includes the leader server and one or more follower servers. The leader server is configured to perform data manipulation language (DML) operations on the row of the table and replicate the DML operations to the one or more follower servers. The leader server performs the change operation on the copy of the row of the table stored at the leader server. The leader server then creates a replication log record for the change operation in a replication pipeline to be replicated to the one or more follower servers and returns a result of the change operation to the client. The replication pipeline includes the components and mechanisms for storing a log record in the leader and propagating the log record to followers, from generation of the log record on the leader to persisting the log record to disk on the followers. The leader server does not wait for a consensus from the one or more follower servers replicating the replication log record to perform the change operation or to return the result of the change operation to the client. Thus, in accordance with the illustrative embodiments, the results of change operations (DML operations) are returned to the client immediately after the change is made and the log record is created in the leader without waiting for consensus from the followers. The propagation of log records to followers occurs asynchronously after returning to the client.

In some embodiments, the leader server receives a database transaction commit command to perform a database transaction commit operation on a particular transaction, creates a replication log record for the database transaction commit operation in the replication pipeline, and in response to receiving acknowledgement that the replication log record for the database transaction commit operation has been appended to a replication log of a consensus number of the one or more follower servers, performs the database transaction commit operation on the particular transaction on the copy of the row of the table at the leader server. Then, the leader server returns the result of the database transaction commit operation to the client. For database transaction commit operations, the leader server does wait for consensus from the follower servers to perform the database transaction commit operation and return the result to the client. Thus, in accordance with the illustrative embodiments, database transaction commit operation log records are replicated synchronously. The leader server performs DML operations and database transaction commit operations asynchronously, performs replication of the DML log records asynchronously, and performs replication of the commit log records synchronously, thus enabling fast, automatic shard failover with zero data loss and strong consistency.

In accordance with some illustrative embodiments, to ensure consistency between leader transaction commits and synchronous log replication, the leader server prepares the local transaction for commit and marks the transaction as in-doubt and then sends the commit log record to the follower servers. Upon receiving the consensus of this commit log record, the leader server can commit the local transaction. Upon failure of the leader server, if the old leader becomes a follower and there is a consensus for the commit log record based on the replication log, the in-doubt state of the local transaction in the old leader can be committed; otherwise, the transaction is rolled back in the old leader.

In alternative embodiments, before committing a local transaction, the leader server sends a pre-commit log record to the follower servers. Upon receiving a consensus of the pre-commit record, the leader server can commit the local transaction and send a post commit log record to the follower servers. Upon failure of the leader shard server and the leader becoming a follower, if there is a consensus for the pre-commit log record based on the replication log, the local transaction in the old leader can be committed. If the local transaction in the old leader was rolled back by the database, the transaction will be replayed to the old leader based on the replication log.

In accordance with the illustrative embodiments, chunks are grouped into replication units (RUs) to optimize replication efficiency. A chunk is a unit of distribution in sharded database systems. A sharded database system comprises multiple shard servers. In a sharded database of a sharded database system, sharded tables are each divided across chunks; a chunk may contain parts of multiple tables. There are often large numbers (1000s or 10,000s) of chunks, which minimizes data movement during resharding and minimizes dynamic chunk splitting. In accordance with some illustrative embodiments, chunks are assigned to RUs based on load and replication throughput. Splitting RUs and merging RUs do not interrupt concurrent user workload or require routing changes as the relevant chunks remain in the same set of shard servers. In addition, transactions spanning chunks within an RU do not require distributed transaction processing.

In accordance with illustrative embodiments, each replication unit has a replication factor (RF), which refers to the number of copies/replicas of the replication unit, including the primary copy at the leader, and an associated distribution factor (DF), which refers to the number of shard servers taking over the workload from a failed leader shard server. The replication factor must be an odd number to determine a majority. The higher the DF, the more balanced workload distribution is after a failover. In some embodiments, RUs are placed in rings of shard servers, where the number of shard servers in a ring is equal to the replication factor. This placement helps with schema upgrades. In the case of barrier DDLs, quiescing the workload can be restricted to a ring of shard servers instead of the entire sharded database. Alternatively, placement can be done in the form of a single ring. For example, a leader RU on shard 1 is replicated on shards 2 and 3, leader RU on shard 2 is replicated on shards 3 and 4, and so on. For a single ring structure, barrier DDLs result in quiescing the entire sharded database; however, when adding a new shard, it is possible to restrict the number of RU splits, moves, and merges to a fixed number, reducing data movement during incremental deployment and making incremental deployment a more deterministic operation. Removing a shard server (e.g., due to failure or scaling down) can be done similarly in multiple ring placement or single ring placement.

In accordance with illustrative embodiments, a lead-sync log record is used to synchronize the replication logs of follower shards to the leader shard. In response to a failure to determine that there is a consensus for a database transaction commit operation after a shard server becomes a new leader, the new leader shard performs a sync operation using the lead-sync log record to synchronize replication logs of the follower shards to the replication log of the new leader. The lead-sync log record requires consensus. Thus, the new leader can determine whether there is consensus for the database transaction commit operation based on the result of the sync operation. The new leader performs the sync operation by sending the lead-sync log record to the follower shard servers.

In an embodiment, when recovering from a database failure, a shard server identifies a first transaction having a first log record but not a post-commit log record in the replication log, defines a recovery window in the replication log starting at the first log record of the identified first transaction and ending at the lead-sync log record, identifies a set of transactions to be recovered, and performs a recovery action on the set of transactions to be recovered. Any transaction having a log record outside the recovery window is not included in the set of transactions to be recovered, any transaction having a post-commit log record within the recovery window is not included in the set of transactions to be recovered, and any transaction having a rollback log record in the recovery window is not included in the set of transactions to be recovered. This allows the shard server to match the state of the replication log with the state of the database transactions by recreating missing log entries and replaying or rolling back transactions.

Implementations of the illustrative embodiments are described below with reference to a sharded database management system; however, aspects of the illustrative embodiments can be applied to other types of database management systems. A non-sharded database may be represented in some embodiments as a sharded database with only one shard where all the chunks are within that one database, which can be a single server instance or a Real Application Cluster (RAC). In other embodiments, a non-sharded database may be a mirrored database implementation, where the non-sharded database may be represented as a sharded database with one replication unit that includes all chunks, the replication group includes all servers, and the replication factor is equal to the number of servers. That is, a replication group can include all or a subset of the servers, and a replication unit can include all or a subset of the chunks of the database.

Raft Protocol

Raft is a consensus protocol for managing a replicated log. To enhance understandability, Raft separates the key elements of consensus, such as leader election, log replication, and safety, and enforces a stronger degree of coherency to reduce the number of states that must be considered. FIG. 1 is a block diagram illustrating a distributed computing system with a state machine and log replicated across a plurality of computing nodes in accordance with a consensus protocol in which aspects of the illustrative embodiments may be implemented. In the example shown in FIG. 1, there is a leader node 110 and two follower nodes 120, 130; however, the distributed computing system can include other numbers of nodes depending on the configuration or workload. For example, the number of nodes in the group of participant nodes can be scaled up or down depending on the workload or other factors that affect resource usage. Consensus protocols typically arise in the context of replicated state machines. As shown in FIG. 1, state machines 112, 122, 132 are replicated across a group of computing nodes 110, 120, 130, respectively. State machines 112, 122, 132 operate to compute the same state and continue to operate even if one or more of the computing nodes 110, 120, 130 are down.

Replicated state machines are implemented using replicated logs. Each node 110, 120, 130 stores a log 115, 125, 135, respectively, containing a series of commands that are executed in order by its state machine 112, 122, 132. Each log should contain the same commands in the same order, so each state machine will process the same sequence of commands. Because the state machines 112, 122, 132 are deterministic, each computes the same state and the same sequence of outputs.

Keeping the replicated log consistent is the purpose of the consensus protocol. The consensus module 111 on a leader node 110 receives commands from clients, such as client 105, and adds them to its log 115. The consensus module 111 of leader node 110 communicates with the consensus modules 121, 131 of the follower nodes 120, 130 to ensure that their logs 125, 135 eventually contain the same requests or commands in the same order, even if one or more nodes fail. Once commands are properly replicated, each node's state machine processes them in log order, and the outputs are returned to client 105. As a result, the nodes 110, 120, 130 appear to form a single, highly reliable state machine.

A Raft cluster or group, also referred to herein as a replication group, contains several nodes, such as servers. For example, a typical Raft group may include five nodes, which allows the system to tolerate two failures. At any given time, each server is in one of three states: leader, follower, or candidate. In normal operation, there is exactly one leader, and all other participant nodes are followers. Followers are passive and issue no requests on their own; followers simply respond to requests from leaders and candidates. The leader handles all client requests. If a client contacts a follower, the follower redirects it to the leader. The third state, candidate, is used to elect a new leader.

Once a leader has been elected, it begins servicing client requests. Each client request contains a command to be executed by the replicated state machines. The leader node 110 appends the command to its log 115 as a new entry, then issues AppendEntries RPCs in parallel to each of the other nodes 120, 130 to replicate the entry. Each log entry stores a state machine command along with the term number when the entry was received by the leader. The term numbers in log entries are used to detect inconsistencies between logs and to ensure some of the properties. Each log entry also has an integer log index identifying its position in the log.

Raft guarantees that "committed" entries are durable and will eventually be executed by all of the available state machines. A log entry is committed once the leader that created the entry has replicated it on a majority of the servers (consensus). This also commits all preceding entries in the leader's log, including entries created by previous leaders. The leader keeps track of the highest index it knows to be committed, and it includes that index in future AppendEntries RPCs (including heartbeats) so that the other servers eventually find out.

Raft Protocol in a Replicated DBMS

The Raft consensus protocol is described herein with respect to a cluster or group of computing nodes, such as servers. In the context of a replicated DBMS, the Raft consensus protocol is applied to replicate a log of commands that is to be executed by the state machines of database servers to apply changes to a database. Changes to be applied to a database by a leader database server (e.g., a leader shard in a sharded database system) are recorded in a log at the leader database server and replicated to one or more follower database servers. In turn, each follower database server receives the commands in its log and applies the changes, in order, using its state machine, to a respective replica of the database.

In a replicated DBMS implementation, the leader node intercepts changes (e.g., data manipulation language (DML) commands, piecewise large object (LOB) updates, JavaScript™ object notation (JSON) inserts and updates) as logical change records (LCRs). The leader node constructs Raft log records based on the LCRs, which are replicated to follower database servers.

As an example of a specific implementation of a replicated DBMS, sharding distributes segments of a data set across many database servers on different computers (nodes). Sharding is a data tier architecture in which data is horizontally partitioned across independent database servers. Each database server is hosted on a dedicated computing node with its own local resources. Each database server in such a configuration is referred to as a "shard server" or "shard." All of the shards together make up a single logical database system, which is referred to as a sharded database management system (SDBMS). In some embodiments, horizontal partitioning involves splitting a database table across shards so that each shard contains the table with the same columns but a different subset of rows. A table split up in this manner is also known as a sharded table. In an SDBMS, each participant node can be a leader for one subset of data and a follower for other subsets of data.

In the context of a replicated DBMS, such as an SDBMS, the Raft consensus protocol handles leader election, log replication, and replication group membership changes with modifications to be described below. The modifications of the illustrative embodiments help to ensure asynchronous database transaction replication for fast, automatic shard failover with zero data loss, strong consistency, full SQL support, and horizontal scalability.

Grouping of Chunks for Replication

Figure 2:
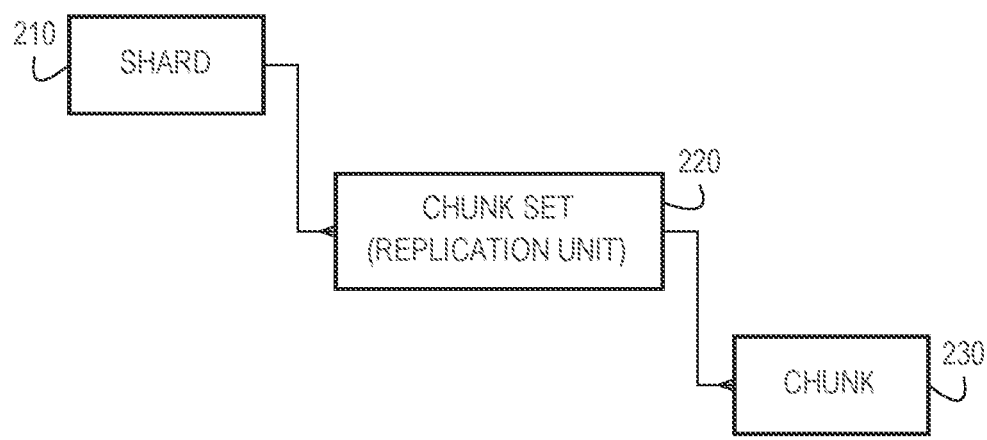
FIG. 2 is a block diagram depicting grouping of chunks for replication in accordance with an illustrative embodiment.

A replication unit (RU) consists of a set of chunks. FIG. 2 is a block diagram depicting grouping of chunks for replication in accordance with an illustrative embodiment. A shard 210 can have multiple chunk sets (RUs) 220. Each RU 220 has a set of chunks 230. A smaller replication unit has lower overhead of instantiation after a shard failure. Too many RUs may have higher run-time overhead (e.g., processes). Thus, there is a tradeoff between lower overhead with smaller RUs (i.e., smaller chunk sets) and lower run-time overhead with larger RUs (i.e., fewer RUs).

Each RU consists of a set of chunks. All transactions in an RU are replicated in the same replication pipeline, which consists of a set of processes, in-memory data structures, and the related replication log. To minimize replication overhead, the illustrative embodiments configure a size of the replication unit to maximize throughput. A large replication unit may increase data movement time during resharding.

Figure 3:
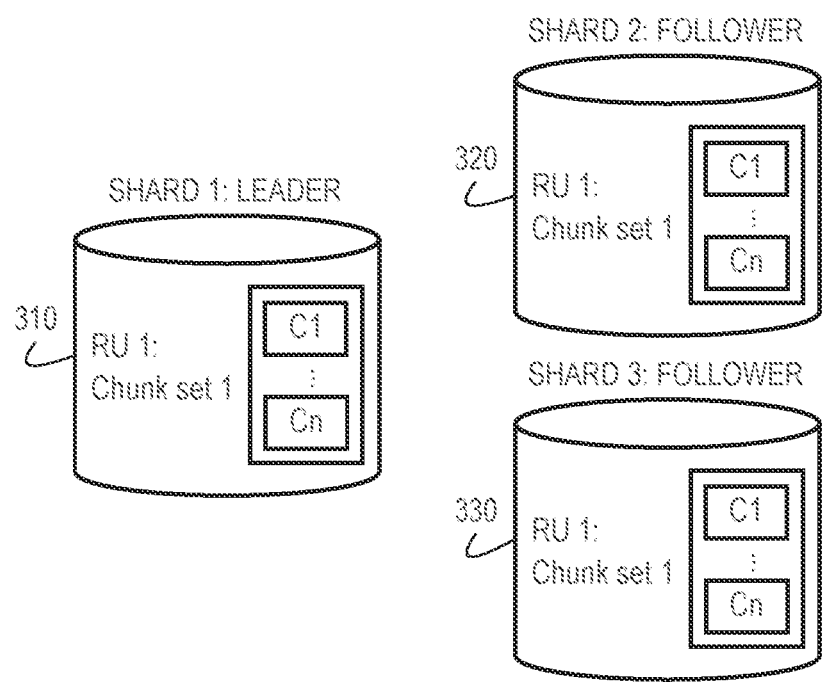
FIG. 3 illustrates a replication unit in a sharded database management system in accordance with an illustrative embodiment.

FIG. 3 illustrates a replication unit in a sharded database management system in accordance with an illustrative embodiment. Each RU has a leader shard server 310 and a set of follower shard servers 320, 330, and the leader shard and all follower shards have the same chunk set. All DML operations for a particular row are performed in the leader and replicated to its followers. This is primary copy replication. A shard can be the leader for one replication unit and a follower for other replication units. This leads to better utilization of hardware. All reads are routed to the leader, unless an application explicitly requests a read from a specified follower shard and tolerates stale data, which may be beneficial if the application is geographically closer to a follower.

In accordance with illustrative embodiments, each replication unit has a replication factor (RF), which refers to the number of copies/replicas of the replication unit, including the primary copy at the leader. The Raft protocol requires most replicas available for writes; however, no read quorum is required. This is in contrast with NoSQL databases. With RF=3, one replica failure is tolerated; with RF=5, two replica failures are tolerated. The illustrative embodiments maintain the replication factor as shards fail assuming there is capacity in other available shards. Each replication unit also has an associated distribution factor (DF), which refers to the number of shard servers taking over the workload from a failed leader shard server. The higher the DF, the more balanced workload distribution is after a failover.

Asynchronous Database Transaction Replication Based on Synchronous Raft Log

User Request Flow

Figure 4:
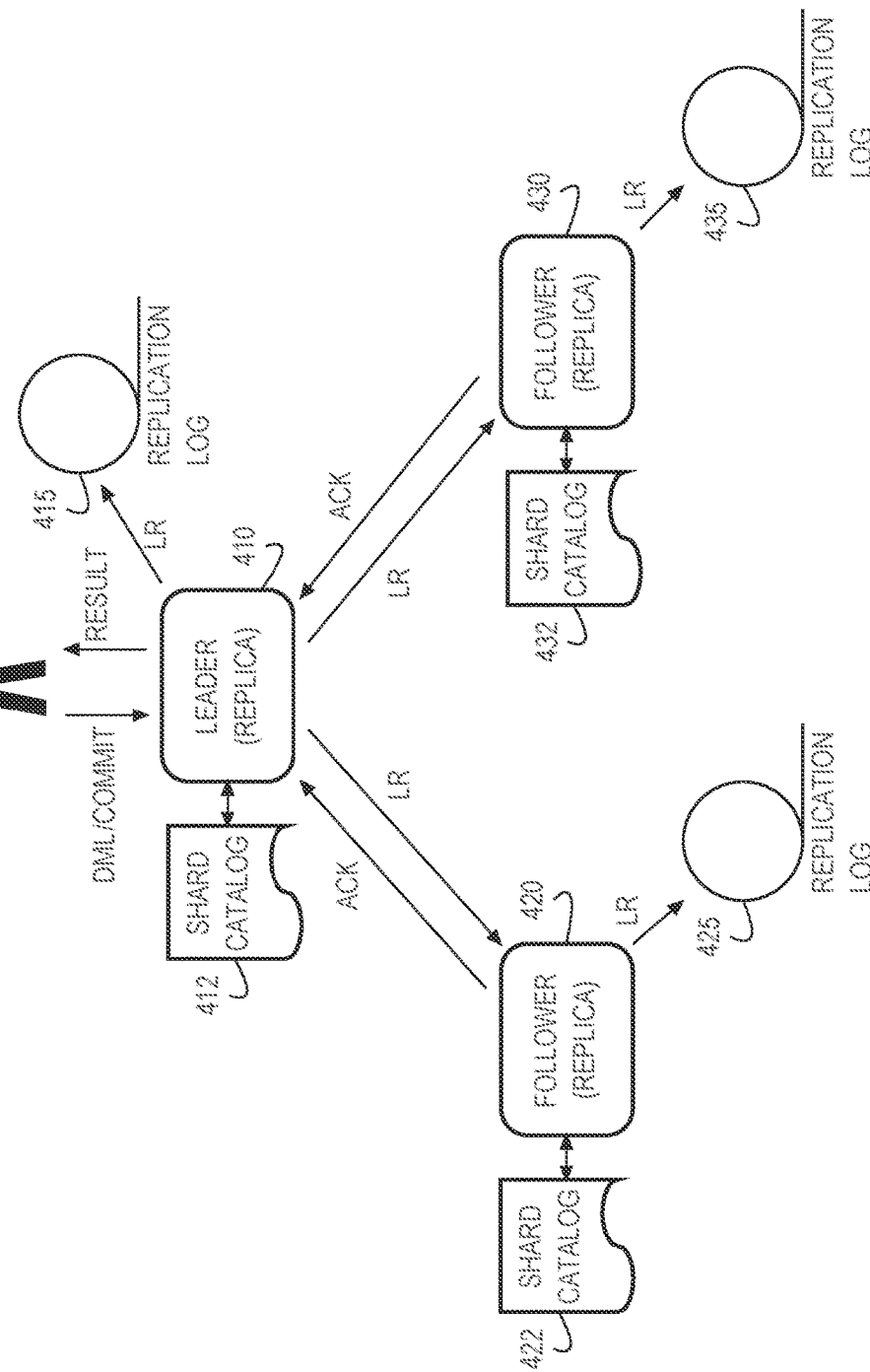
FIG. 4 is a diagram illustrating a consensus protocol-based replication user request flow in accordance with an illustrative embodiment.

The illustrative embodiments use a consensus protocol, such as the Raft protocol, to synchronously replicate LCRs and perform leadership election upon failure or upon demand. Synchronous replication of LCRs does not imply synchronous replication of transactions at the follower shard server. FIG. 4 is a diagram illustrating a consensus protocol-based replication user request flow for a change operation in accordance with an illustrative embodiment. For a given replication unit, there is a leader 410 and a plurality of followers 420, 430. Each node or server 410, 420, 430 has a respective shard catalog 412, 422, 432, which is a specialized database that supports automated shard deployment, centralized management of a sharded database, and multi-shard queries. For a given replication unit (set of chunks), the shard catalogs 412, 422, 432 maintain data describing which server is the leader and which servers are followers. In an alternative implementation, each node or server can share a shard catalog.

A logical change record (LCR) encapsulates a row change (e.g., insert, update, LOB operation, JSON operation, old/new values) and transaction directives (e.g., commits, rollbacks, partial rollbacks). A replication log record (LR) is an LCR with a valid log index. Log records in a replication unit have strictly increasing log indices. Replication logs contain log records for interleaved, uncommitted transactions, like redo logs, but no undos or indices. This contrasts with other solutions that contain only committed transactions. The terms logical change record (LCR) and log record (LR) are used interchangeably herein.

In accordance with an illustrative embodiment, a read-only (R/O) routing state is maintained for a chunk in a follower RU in a routing map (not shown), and a read-write (R/W) routing state is maintained for a chunk in the leader RU in the routing map. The R/O and R/W states are changed accordingly when there is a leadership change of an RU. In accordance with an illustrative embodiment, the routing map, which is cached outside the database, e.g., in client-side drivers, is invalidated and reloaded via notifications when there is a leadership change.

In existing Raft protocol, the client sends a command to the leader of a Raft group, and the leader appends the command to its log, sends an AppendEntries RPC to all followers, and once a new entry is committed (stored in a consensus number of follower replication logs), the leader executes the command and returns a result to the client, the leader notifies followers of committed entries in a subsequent AppendEntries RPCs, and the followers execute committed commands in their state machines. In contrast, the sharded database replication approach of the illustrative embodiments executes DMLs first in the database before appending them to the replication logs.

In the consensus protocol-based replication approach of the illustrative embodiment, a logical change record (LCR) encapsulates a row change (e.g., insert, update, delete, LOB operation, JSON operation, old/new values) and database transaction directives (e.g., database transaction commits, database transaction rollbacks, partial rollbacks). A log record is an LCR with a valid log index and a term. Log records in a replication group have strictly increasing log indices. Log records contain interleaved, uncommitted transactions, as will be described in further detail below.

In the consensus protocol-based replication approach of the illustrative embodiment, a user/client 401 sends a DML to the leader 410, which performs the DML on its copy (replica) of the replication unit before appending a log record (LR) for the DML to its replication log 415. The leader also returns a result (e.g., and acknowledgement) to the user/client 401 in response to the LR being created in the leader's replication log 415. The result is returned without confirming the followers have stored the LR to their replication logs, and therefore without the followers acknowledging storing the LR. The leader can return to the client before writing this log record to its replication log. The persistence of log records is done asynchronously.

The replication log 415 is propagated to followers 420, 430, which store the LR for the DML in replication logs 425, 435, respectively. In response to a follower 420 appending the LR to its replication log 425, the follower 420 returns an acknowledgement (ACK). The leader 410 considers a DML LR as committed if a consensus number of followers return an ACK to acknowledge that the LR has been stored in the replication log. Similarly, a follower 420, 430 eagerly executes DMLs while it appends to its replication log 425, 435 in parallel. This minimizes the impact to user transaction response time and improves replication efficiency.

To maintain ACID properties among replicas, the leader only commits a relevant database transaction when the commit LCR is a committed log record (appended to a consensus number of follower replication logs), which means any LCR previously generated for the database transaction is also a committed log record. Thus, in the sharded database replication approach of the illustrative embodiment, a user/client 401 sends a database transaction commit command to the leader 410, which creates a commit LR in its replication log 415 and propagates the replication log 415 to followers 420, 430. The leader only commits the database transaction in its copy of the replication unit when it has received an acknowledgement for the commit LR from a consensus number of followers. The leader generates the post-commit LR and then returns a result of the database transaction commit (e.g., and acknowledgement) to the user/client 401.

Figure 5:
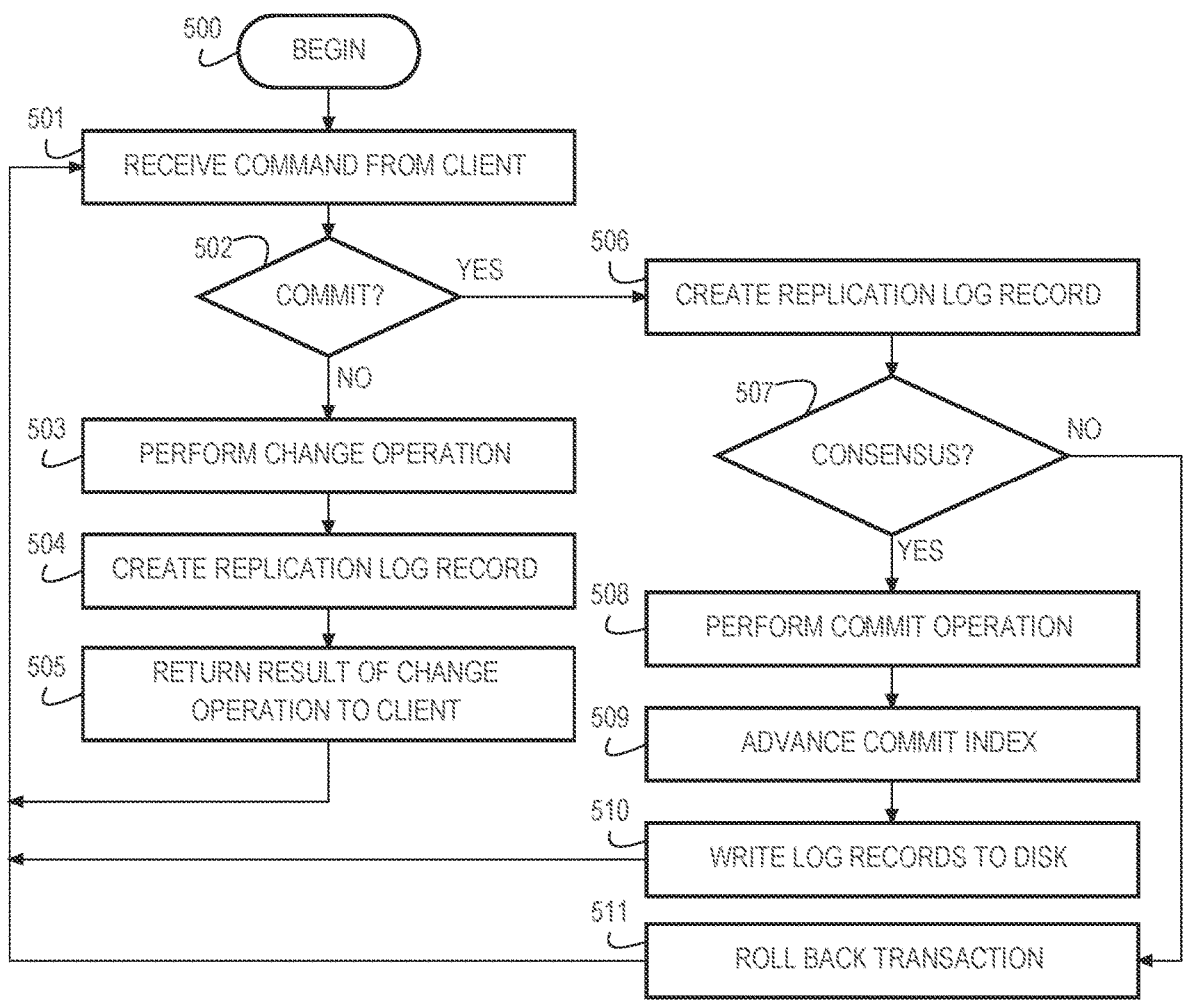
FIG. 5 is a flowchart illustrating operation of consensus protocol-based replication for a sharded database management system in accordance with an illustrative embodiment.

FIG. 5 is a flowchart illustrating operation of consensus protocol-based replication for a sharded database management system in accordance with an illustrative embodiment. Operation begins (block 500), and the leader shard server receives a command from a client (block 501). The leader shard server determines whether the command is a database transaction commit command (block 502). If the command is not a database transaction commit command (block 502: NO), then the command is a change operation (e.g., an insert, update, delete, etc.), and the leader shard server performs the change operation (block 503). The leader shard server then creates a replication log record in its replication log (block 504) and returns a result of the change operation to the client (block 505). Thereafter, operation returns to block 501 to receive the next command from the client.

If the command is a database transaction commit command (block 502:YES), then the leader shard server creates a replication log record for the database transaction commit in its replication log (block 506). The leader shard server determines whether it has received a consensus for the commit log record (block 507). If consensus is received (block 507:YES), then the leader shard server performs the database transaction commit operation (block 508), advances the commit index (block 509), and writes the log records to disk (block 510). Thereafter, operation returns to block 501 to receive the next command from the client.

If consensus is not received (block 507:NO), then the leader shard server rolls back the database transaction (block 511). Thereafter, operation returns to block 501 to receive the next command from the client.

Architecture

Figure 6:
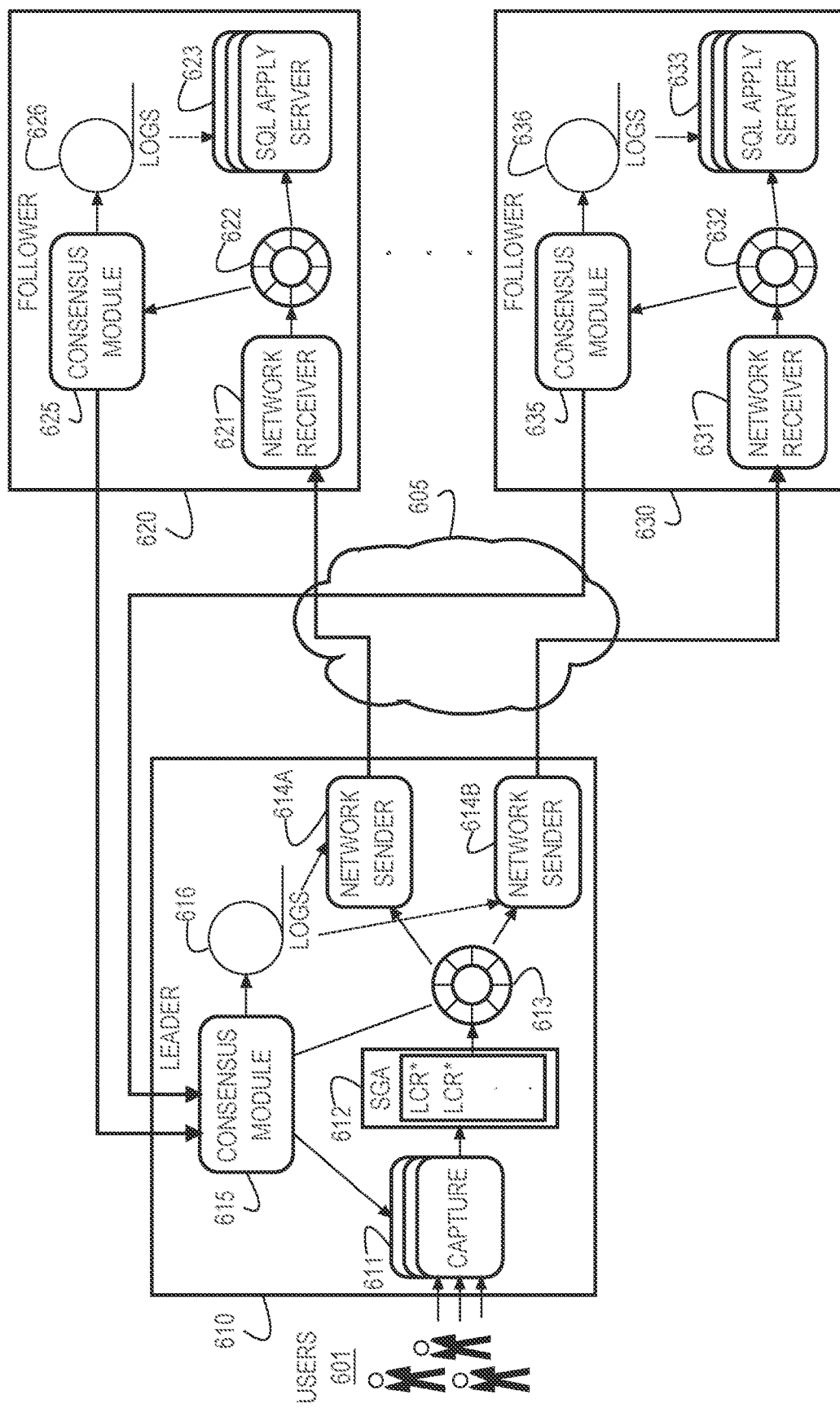
FIG. 6 is a block diagram illustrating an architecture for consensus protocol-based replication in a sharded database in accordance with an illustrative embodiment.

FIG. 6 is a block diagram illustrating an architecture for consensus protocol-based replication in a sharded database in accordance with an illustrative embodiment. Users 601 send DML and transaction directives to leader 610 for a given replication unit. As shown in FIG. 6, leader 610 includes capture components 611, System Global Area (SGA) 612, in-memory replication log queue 613, network senders 614A . . . 614B, consensus module 615, and persistent replication log in disk 616. The capture components 611 intercept DML executions and capture DMLs, piecewise LOB updates, JSON inserts and updates (JSON Transform) as LCRs. The capture components 611 also intercept transaction execution to capture database transaction commits, database transaction rollbacks, and rollbacks-to-savepoint.

The SGA is a group of shared memory structures, known as SGA components, that contain data and control information for one database instance. The SGA is shared by all server and background processes. In the depicted example, the capture components 611 store the LCRs to be inserted into the in-memory replication log queue 613.

In some embodiments, there is a commit queue (not shown) between SGA 612 and consensus module 615. The commit queue contains the commit record for each transaction. When consensus module 615 receives an acknowledgement from a follower, it reads the commit queue to find a matching transaction and checks if this transaction obtains consensus. If so, the consensus module posts the user session, which allows the transaction to commit, generates a post-commit LCR, and returns the control to the user.

Network senders 614A, 614B distribute replication logs to followers 620, 630 over network 605. The leader may have a network sender for each follower in the replication group. Consensus module 615 communicates with the consensus modules on other servers, such as consensus modules 625, 635 on followers 620, 630 to ensure that every log eventually contains the same log records in the same order, even if some servers fail.

Follower 620 includes network receiver 621, in-memory replication log queue 622, SQL Apply servers 623, consensus module 625, and persistent replication log in disk 626. Similarly, follower 630 includes network receiver 631, in-memory replication log queue 632, SQL Apply servers 633, consensus module 635, and persistent replication log in disk 636. Network receivers 621, 631 receive replication logs from the leader 610 and hand LCRs to the SQL Apply servers 623, 633.

Consensus modules 615, 625, 635 have an LCR persister process at each replica (including the leader) to persist LCRs durably in persistent replication logs in disk 616, 626, 636. In the follower, the consensus module 625, 635 sends back highest persisted log index to its leader 610 to acknowledge that log records up to the highest persisted log index have been persisted.

Only the leader can process user DML requests. A follower can automatically redirect DMLs to the leader. In the DML execution path, the leader constructs a log record to encapsulate the DML change, enqueues the log record into an SGA circular buffer, and immediately returns to the user. The illustrative embodiments decouple replication from the original DMLs and pipeline the DML logging, propagation, and SQL Apply at followers asynchronously with minimal latency. For multi-DML transactions, the replication largely overlaps with user transactions, and the latency overhead from the commit consensus is much less significant.

DML Replication Flow

With reference to FIG. 6, user 601 submits a DML. A capture component 611 constructs an LCR in image format or object format and enqueues it into an in-memory queue 613. In one embodiment, the in-memory queue is a contention-free multi-writer, single-reader queue. The image format LCR in the queue minimizes multiple downstream pickling (e.g., persisting and propagating the LCRs). The leader 610 returns to user 601 immediately after constructing the required log record in the DML execution path.

In-memory queue 613 is a single-writer and multiple-reader queue. LCRs in SGA 612 are stored in a different queue, which is a contention-free multiple-writer and single-reader queue. Each capture process representing the user is a writer to this queue. The LCR producer process is the single reader of this queue and dequeues LCRs from SGA 612, assigns a unique and strictly increasing log index to the LCR, and enqueues it into in-memory queue 613. The strictly increasing log index is an important property of the Raft log.

Asynchronously, the consensus module 615 scans through queue 613 and constructs replication log records based on the LCRs it dequeues. The consensus module 615 (LCR persister) persists the in-memory log records to disk 626. The consensus module 615 (ACK receiver) counts acknowledgements from the followers 620, 630 and advances the log commitIndex appropriately. The network sender 614A, 614B calls the AppendEntries RPC to propagate log records over the network 605 for all followers. For every log record propagation, the network sender 614A, 614B also includes the current commit log index.

The network receiver 621, 631 is automatically spawned due to the connection from the network sender 614A, 614B at the leader. The network receiver 621, 631 enqueues log records into a queue 622, 632 from the wire via the consensus protocol Application Programming Interface (API) if the AppendEntries RPC passes its validation. The consensus module 625, 635 at the follower reads the in-memory queue 622, 632 containing the log records from the leader, persists the log records to disk 626, 636, and sends an acknowledgement back to the leader via a separate network connection.

The SQL Apply server 623, 633 reads LCRs from the in-memory queue 622, 632, assembles transactions from interleaved LCRs from different transactions, and applies transactions to the database. This is referred to herein as "eager apply." If the SQL Apply server 623, 633 is slow or catching up, it may need to retrieve the relevant log records from disk 626, 636.

As mentioned above, the consensus protocol-based replication of the illustrative embodiments does not require explicit consensus on DMLs. As soon as an LCR for a row change is pushed to the replication pipeline, the leader immediately returns the control to the user or allows subsequent processing of the transaction. This minimizes the impact on the user's response time for DMLs. The replication (propagation, persistence) of a DML is done asynchronously in a streaming fashion. If there is consensus on a commit, the replication approach maintains transaction ACID properties among replicas.

Commit Replication Flow

When receiving a database transaction commit for a user transaction from the user 601, the network senders 614A, 614B send the log record containing the transaction commit to all followers 620, 630. In parallel, the consensus module 615 (LCR persister) writes log records to disk 616 and tracks the persisted log index. In other words, the leader 610 does not need to wait for the persistence of the log record containing the transaction commit before sending its log record to followers.

When the leader 610 receives the consensus from a consensus number of followers, the leader advances its log commitIndex if possible. The commit of the user transaction and advancing the commitIndex does not need to be atomic. The leader 610 does not need to verify that the log record has been persisted locally to send the next set of log records to followers 620, 630. The leader needs to ensure that a commit log record is persisted locally before committing the transaction locally. In practice, this log record would have been persisted anyway when the leader receives the consensus. One way is to verify that the persisted log index is equal to or greater than the log index for this transaction commit log record. The leader then commits the transaction and returns success to the user.

If the leader 610 crashes before communicating the consensus of the log record to its followers, a new leader may complete the replication of any last set of committed log records regardless of whether the prior leader is up or not. Because the apply of the transaction commit command and the return to the user are not atomic, the user might resubmit the transaction, possibly to a different leader. Such resubmission of transactions may encounter errors and exist outside the sharded database.

Batched Acknowledgement of Commits

In accordance with the illustrative embodiments, all log records are sent, including commits, in the same stream continuously without any interruption. The acknowledgement is sent back via a separate network connection. There is only one network round trip from each fast follower for an acknowledgement. Even when the leader waits for the acknowledgement of a pending commit for one user transaction, the leader can continue streaming log records with higher log index, including other commits from other user transactions. In some embodiments, all the log records cannot have inter-transaction dependencies. This maximizes concurrency for independent user transactions. This also leads to a natural batching of acknowledgments of commits: one acknowledgement from the follower may include multiple transactions. As a result, this improves replication efficiency. Only one round trip is needed to obtain consensus for a commit log record.

Replication Log Persistence

One set of replication logs is kept for each replica (copy of the RU on a server) in each replication group of servers. There will be no interference among replication units when reading and writing replication logs. There are numerous possible embodiments to persist replication logs in all replicas, including the leader, including the following examples:
1. Since the database redo persistence has been highly optimized, it would be efficient to write replication logs as database redo records. Replication log records are interleaved with database change records in the redo logs. There is no indexing capability when reading redo logs. Hence, it is inefficient to find out a particular replication log record from redo.
2. Write replication logs to an external file or queue. It would be necessary to deploy and monitor an external component.
3. Write replication logs to a database table. The overhead of an insert for every user row change is very high.
4. Implement custom file management.

In accordance with an illustrative embodiment, custom files are implemented so that replication logs can be read faster during recovery (role transition) and when catching up a new replica. In addition, custom files allow transporting replication logs among replicas (e.g., for catchup), moving a follower from one shard server to another, re-instantiating a new follower. The illustrative embodiment employs asynchronous IOs when writing and asynchronous IOs when prefetching and reading.

Figure 7:
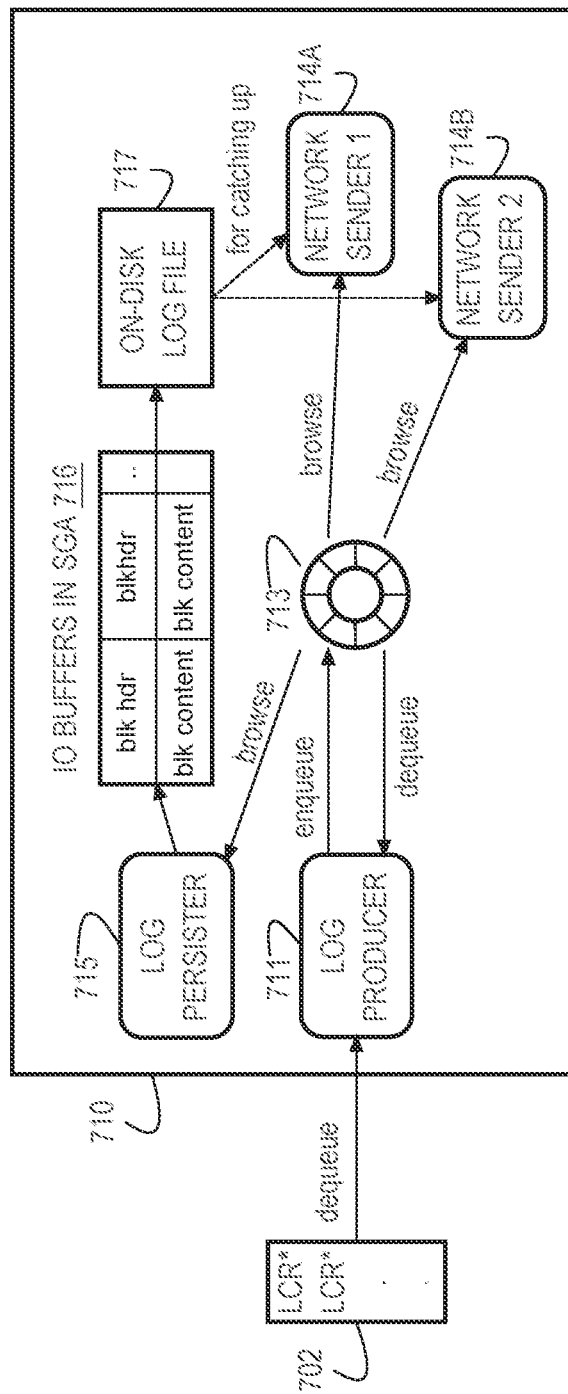
FIG. 7 is a block diagram depicting log persistence optimizations in a leader shard server in accordance with an illustrative embodiment.

FIG. 7 is a block diagram depicting log persistence optimizations in a leader shard server in accordance with an illustrative embodiment. The log persistence process group 710 in the leader shard receives LCRs 702 from SGA. LCR producer process 711 dequeues LCRs 702 and enqueues the LCRs into circular queue 713. The queue in LCRs 702 is a multiple-writer and single-reader queue. Network senders 714A, 714B and LCR persister process 715 are subscribers of the circular queue 713. Network senders 714A, 714B browse the circular queue 713 and distribute replication logs to followers.

LCR persister process 715 maintains a set of IO buffers 716 in the SGA. A log record is dequeued from the circular queue 713 and placed in the IO buffers 716 as it would appear in the on-disk log file 717. On the leader, because the LCR persister process 715 is also a subscriber of the circular queue 713, it must ensure that it dequeues records quickly to ensure that the queue 713 does not fill up. Therefore, IO is asynchronous; as soon as an IO buffer is full, asynchronous IO is issued. This IO is reaped when the buffer is used again or if a commit record is encountered (when all pending IOs are reaped).

The LCR persister process 715 performs the following:
1. Dequeues one or more log records. A log record is a wrapper containing an LCR with a term and a log index.
2. Drops the replication log into one or more IO buffers. When an IO buffer is full, IO is issued asynchronously.
3. When a buffer is to be reused, the issued IO is reaped.
4. On a commit, all pending IOs are reaped.

Log Persistence Optimization in the Follower

Figure 8:
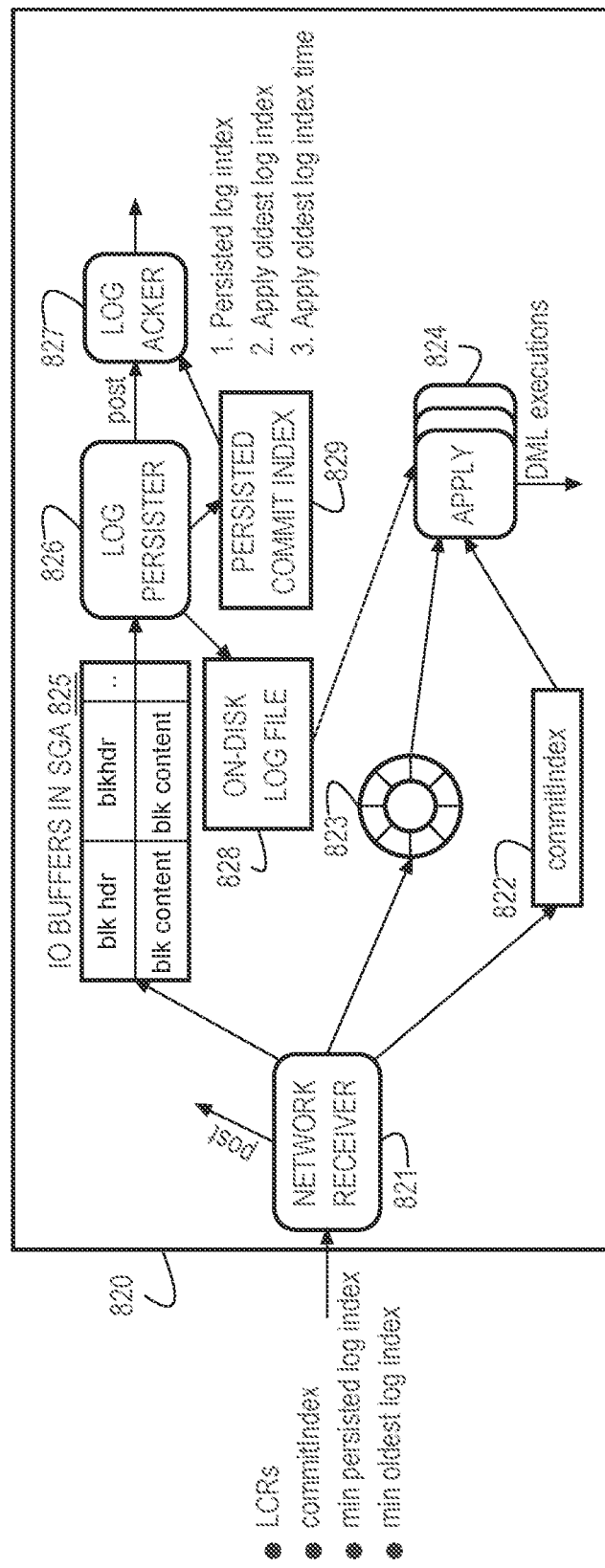
FIG. 8 is a block diagram depicting log persistence optimizations in a follower shard server in accordance with an illustrative embodiment.

Like the log persistence at the leader, each follower uses a replication log file for durably persisting LCRs. FIG. 8 is a block diagram depicting log persistence optimizations in a follower shard server in accordance with an illustrative embodiment. The log persistence process group 820 in a follower shard receives LCRs, commitIndex, minimum persisted log index, and minimum oldest log index from the leader. The network receiver 821 receives the log records from the wire, drops the LCR into the circular queue 823 and the IO buffers 825 in the SGAS, and notifies the LCR persister process 826 if it does not have a free IO buffer.

The LCR persister process 826 persists LCRs from the IO buffers 825 to on-disk log file 828. The LCR persister process 826 monitors the IO buffers 825 and issues a block of buffers as one synchronous IO when a predetermined threshold (e.g., 60%) of buffers are utilized or a commit is received. The LCR persister process 826 also notifies the acknowledgement (ACK) sender 827 when IO is completed.

The ACK sender 827 maintains a record of the last log index 829 that was acknowledged. Whenever the LCR persister process 826 persists a commit index higher than the last acknowledged index, the ACK sender 827 sends this information to the leader.

The network receiver 821 sends the commitIndex 822 to the SQL Apply processes 824. The SQL Apply processes 824 read LCRs from the circular queue 823, assembles transactions from interleaved LCRs from different transactions, and executes DML, operations on the database.

Interleaved Log Records

Figure 9:
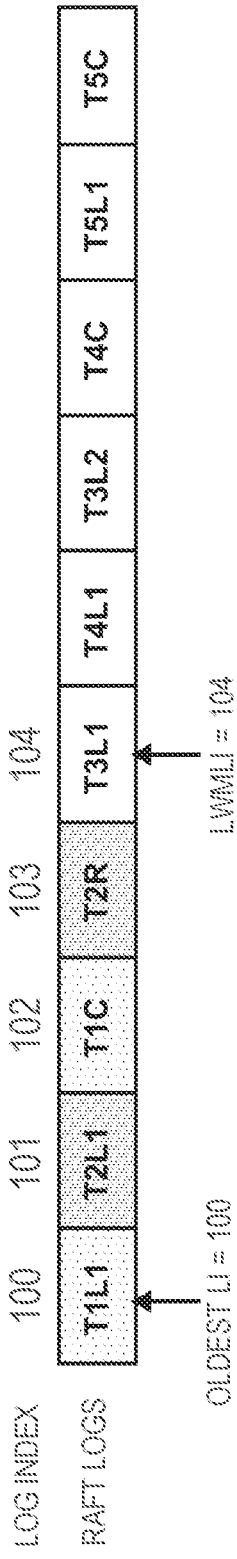
FIG. 9 depicts a replication log with interleaved transactions in accordance with an illustrative embodiment.

Log records contain interleaved, uncommitted transactions in the replication log. FIG. 9 depicts a replication log with interleaved transactions in accordance with an illustrative embodiment. The replication log shown in FIG. 9 includes the raft logs, each of which has a log index. T1L1 means the first LCR in transaction T1. T1C means a commit LCR for transaction T1. T2R means a rollback LCR for transaction T2. As seen in the depicted example, T1L1 has a log index of 100, T2L1 has a log index of 101, T1C has a log index of 102, and T2R has a log index of 103. Therefore, transaction T1 and transaction T2 are interleaved because transaction T2 has log records between the first LCR and the commit LCR of transaction T1.

Apply Progress Tracking

There is one SQL Apply process group in a follower to replicate transactions. In one embodiment, a SQL Apply server consists of an LCR reader process and an apply reader process, a coordinator process, and multiple applier processes. The apply LCR reader process dequeues LCRs, possibly reads LCRs from a persistence layer, computes hash values for relevant key columns. The apply reader process assembles LCRs into complete transactions, computes dependencies among transactions, and passes the transactions to the coordinator. The coordinator process assigns transactions to available appliers based on the transaction dependencies and commit ordering. Each applier process executes an entire transaction at the replica database before requesting another one. The appliers processes independent transactions concurrently for better throughput. To minimize apply latency, an applier starts applying DMLs for a transaction before receiving the commit or rollback. This is referred to as "eager apply." However, an applier cannot commit a transaction even if it sees the commit LCR for this transaction unless the commit LCR has been consented. Each transaction is applied exactly once.

Figure 10:
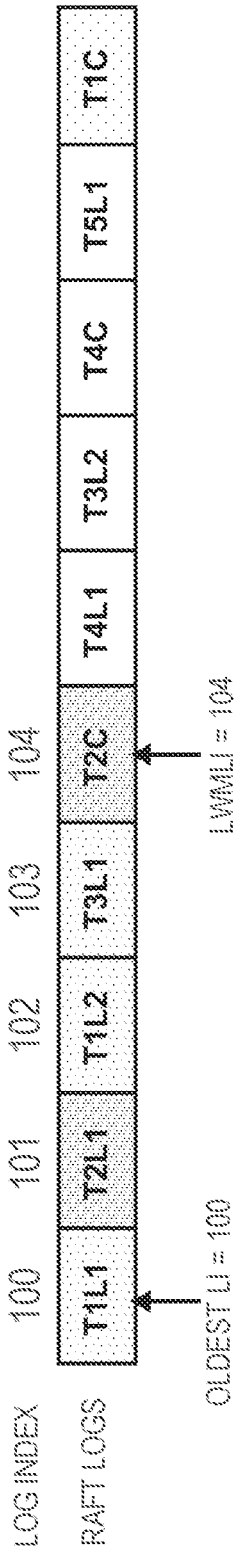
FIG. 10 depicts apply progress tracking in a replication log in accordance with an illustrative embodiment.

FIG. 10 depicts apply progress tracking in a replication log in accordance with an illustrative embodiment. SQL Apply maintains two key values about its progress: Low Watermark Log Index (LWMLI) and Oldest Log Index. All transactions with a commit index less than or equal to the LWMLI have been applied and committed. The oldest log index is the log index of the earliest log record the apply may need. For each replicated transaction, SQL Apply inserts a row in a system table (e.g., appliedTxns) containing the source transaction ID, the log index of the first DML, and the log index of the txCommit, which refers to the commit for a user transaction. During recovery, the recovery process or the apply process can start reading from the Oldest Log Index, skip already applied transactions based on the appliedTxns, and complete the replication of any open transactions. As an optimization, multiple transactions can be batched and applied as one transaction in the follower for better performance.

Replication Unit Placement

There are multiple ways to place replication units (RUs) across shards in a sharded database with trade-offs.

Multiple Ring Placement

Figure 11:
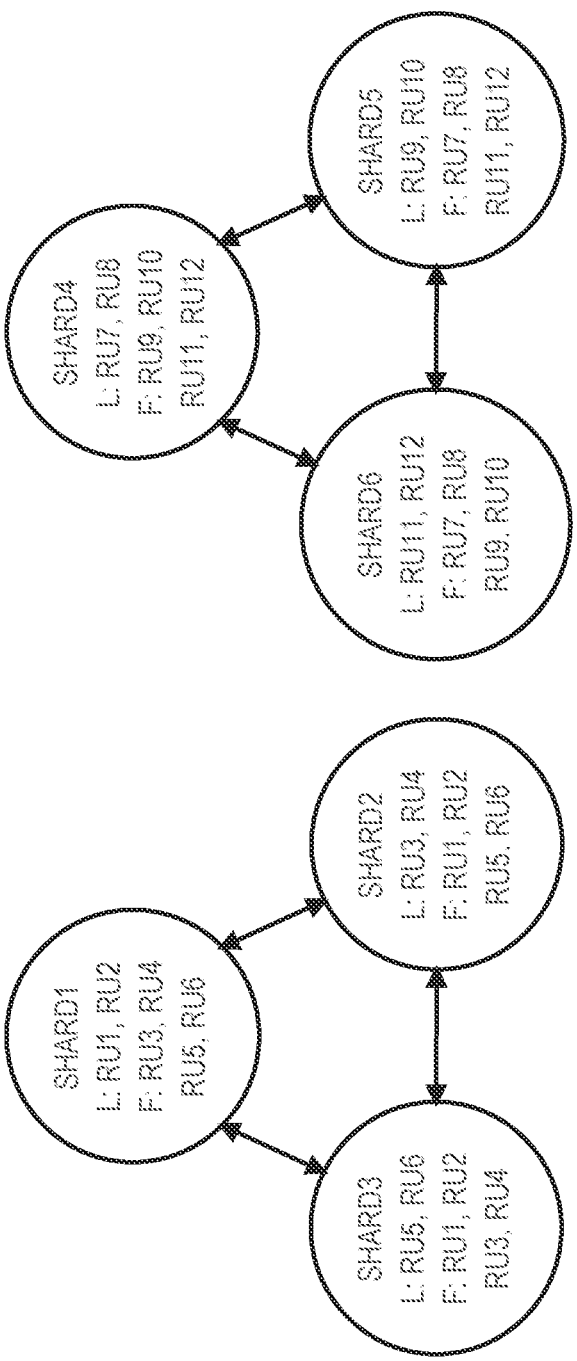
FIG. 11 depicts an example of multiple ring placement of replication units in accordance with an illustrative embodiment.

During initial placement, in a balanced case, RUs are placed in rings, where the size of the ring is equal to the replication factor. This placement helps with schema upgrades. In the case of barrier DDLs, quiescing the workload can now be restricted to a ring of shard servers instead of the entire sharded database management system. For example, assuming 6 shards with 12 RUs and RF=3 and each RU containing 60 chunks, initial placement balances all RUs across the 6 shards to create two rings. FIG. 11 depicts an example of multiple ring placement of replication units in accordance with an illustrative embodiment. In this example, RU1 and RU2 are replicated from Shard1 to Shard2 and Shard3, RU3 and RU4 are replicated from Shard2 to Shard1 and Shard3, and RU5 and RU6 are replicated from Shard3 to Shard1 and Shard2. Similarly, RU7 and RU8 are replicated from Shard4 to Shard5 and Shard6, RU9 and RU10 are replicated from Shard5 to Shard4 and Shard6, and RU11 and RU12 are replicated from Shard6 to Shard4 and Shard5.

All replications in RU1 to RU6 are contained within Shard1, Shard2, and Shard3. A similar structure is observed for the second ring, where all replications in RU7 to RU12 are contained within Shard4, Shard5, and Shard6. With this placement, any quiescing for barrier DDLs can be restricted to one ring without affecting the entire sharded database management system. Application schema upgrades can be performed in a way that affects only a small subset of shard servers.

In the depicted example, RF=3, and the size of each ring is three. If RF=5, then the size of each ring would be five shard servers.

For incremental deployment, the ideal case is to add RF number of shard servers at the same time. In the example shown in FIG. 11, if three shard servers are added, an equal number of chunks would be pulled from all RUs to create six new RUs, which would be deployed on the three new shard servers creating a third ring of shard servers.

However, if the user adds one shard server at a time, then the following steps occur:

Step 1: With one ring and three shard servers, the topology is shown in Table 1 as follows:

TABLE 1

|  | Shard1 (RUs) | Shard2 (RUs) | Shard3 (RUs) |
|---|---|---|---|
| Leader | 1, 2 | 3, 4 | 5, 6 |
| Follower | 3, 4, 5, 6 | 1, 2, 5, 6 | 1, 2, 3, 4 |

There are 60 chunks per RU. A barrier DDL in this case must synchronize across three shard servers.

Step 2: Add Shard4. Even though a shard server is being added, the one ring is kept because there are not enough shard servers to make two smaller rings. Chunks for the new RU are pulled equally from the other RUs. There are now 45 chunks per RU. After adding the fourth shard server, synchronization is required across all four shard servers for any barrier DDL propagation. The topology is shown in Table 2 as follows:

TABLE 2

|  | Shard1 (RUs) | Shard2 (RUs) | Shard3 (RUs) | Shard4 (RUs) |
|---|---|---|---|---|
| Leader | 1, 2 | 3, 4 | 5, 6 | 7, 8 |
| Follower | 5, 6, 7, 8 | 1, 2, 7, 8 | 1, 2, 3, 4 | 3, 4, 5, 6 |

Step 3: Add Shard5. Again, no new smaller ring is created for the same reason. The new shard server pulls chunks from all shard servers. There are now 36 chunks per RU. After adding the fifth shard server, synchronization is required across all five shard servers for any barrier DDL propagation. The topology is shown in Table 3 as follows:

TABLE 3

|  | Shard1 (RUs) | Shard2 (RUs) | Shard3 (RUs) | Shard4 (RUs) | Shard5 (RUs) |
|---|---|---|---|---|---|
| Leader | 1, 2 | 3, 4 | 5, 6 | 7, 8 | 9, 10 |
| Follower | 7, 8, 9, 10 | 1, 2, 9, 10 | 1, 2, 3, 4 | 3, 4, 5, 6 | 5, 6, 7, 8 |

Step 4: Add Shard6. This time, followers are moved around to form two smaller rings. There are now 30 chunks per RU. After adding the sixth shard server, synchronization is required across only three shard servers for any barrier DDL. The topology is shown in Table 4 as follows:

TABLE 4

|  | Shard1 | Shard2 | Shard3 | Shard4 | Shard5 | Shard6 |
|---|---|---|---|---|---|---|
| Leader | 1, 2 | 3, 4 | 5, 6 | 7, 8 | 9, 10 | 11, 12 |
| Follower | 3, 4, 5, 6 | 1, 2, 5, 6 | 1, 2, 3, 4 | 9, 10, 11, 12 | 7, 8, 11, 12 | 7, 8, 9, 10 |

As seen above in Table 4, Shard1, Shard2, and Shard3 form one ring, and Shard4, Shard5, and Shard6 form a second ring. Therefore, a barrier DDL can be applied to Shard1, Shard2, and Shard3 (quiescing just the workload for RUs 1-6), and then to Shard4, Shard5, and Shard6 (quiescing workload for RUs 7-12).

Step 5: Beyond this point, it is no longer necessary to modify the first ring (Shard1, Shard2, Shard3) as new shards are added. Any new shard servers will pull chunks from all shards, but the RU composition of the first ring will not change. As Shard1 and Shard8 are added, the second ring (Shard4, Shard5, Shard6) will expand to five shard servers, and at Shard9, Shard4 through Shard9 will split to form two smaller rings to form a total of three smaller rings. This layout allows barrier DDLs to be applied to a single ring of shard servers without impacting the entire sharded database management system.

Single Ring Placement

Replication unit placement can also be done in the form of a single ring. The leader chunk set on Shard1 is replicated on Shard2 and Shard3, the leader chunk on Shard2 is replicated on Shard3 and Shard4, and so on. For example, with four initial shards, RF=3, DF=2, and sixty chunks per RU, there will be eight RUs, numbered 1 through 8, with a total of 480 chunks. The leader chunk set is marked with "L", the follower chunk set is marked with "F". The number indicates the number of chunks in the chunk set. The chunk distribution is shown in Table 5 as follows:

TABLE 5

| 1L - 60 | 3L - 60 | 5L - 60 | 7L - 60 |
| 2L - 60 | 4L - 60 | 6L - 60 | 8L - 60 |
| 5F - 60 | 1F - 60 | 1F - 60 | 3F - 60 |
| 6F - 60 | 2F - 60 | 2F - 60 | 4F - 60 |
| 7F - 60 | 7F - 60 | 3F - 60 | 5F - 60 |
| 8F - 60 | 8F - 60 | 4F - 60 | 6F - 60 |

In the RF=3, DF=2 configuration, adding a new shard server results in two leader RUs and four follower RUs on the new shard server. This can be achieved in two ways:

1. Take an equal number of chunks from all shard servers to populate the new shard server. This approach maintains a balanced system at the cost of many data movements among the followers. Since all leaders on all shard servers are affected by this approach, all followers on all shard servers are also affected by this approach—i.e., if n shard servers are present in the system, then the cost of adding the $(n+1)^{th}$ shard depends on n. For example, consider 4 shards having 2 leader RUs and 4 follower RUs each. When chunks are pulled away from each RU, 8 leader RUs are shrunk to create the $9^{th}$ and $10^{th}$ RUs on the $5^{th}$ shard. The followers for each affected RU also must be shrunk to match the leader—adding a shard server thus ends up touching every RU on every shard server.

2. Restrict the "donor" shard servers to a small, fixed number when populating the new shard server. This approach does not attempt to achieve a balanced system when adding a shard server, but the tradeoff allows the system to reach a stable state much faster in a fixed number of data movements. In this approach, adding a shard server into the ring involves pulling chunks from the four shard servers nearest to it (two on either side). This is done in the following manner:
   a. Deciding the insertion point: Find 4 adjacent shard servers that together have the highest number of chunks when compared to all other groups of adjacent 4. The new shard server should be inserted in the middle of these 4 donor shard servers. As a special case, going from 3 to 4, insert anywhere and pull from all 3 shard servers.
   b. Split leader chunk sets on the 4 donor shard servers (for DF=2, 8 leaders split). Splits should be done in such a way that all 5 shard servers (the 4 donor shards and the new shard) are left with almost the same number of chunks per leader chunk set.
3. Split the corresponding follower chunk set in the same way (for RF=3, 16 followers split).
4. Move 2 leaders from each donor shard server to the new shard server (8 leaders move).
5. On the new shard server, merge in groups of 2 RUs so there are 4 leader RUs (down from 8). Merge the corresponding follower RUs. This can be done without any data movement.
6. At this point, the leader chunk sets on the new shard server have all but 4 followers in the correct position. Move these 4 follower chunk sets to do the final round of merges.
7. Merge RUs on the new shard server so there are 2 RUs left, where each RU has 4 chunk sets. Merge the corresponding follower RUs.
8. Move followers into the new shard server (4 followers move).
9. Summary: 8 leader splits, 16 follower splits, 8 leader moves, 4 leader merges, 8 follower merges, 4 follower merges, 2 leader merges, 4 follower merges, 4 follower moves.

A single ring structure has one disadvantage: barrier DDLs result in quiescing the entire sharded database management system. However, when adding a new shard server, it is possible to restrict the number of RU splits, moves, and merges to a fixed number, reducing the data moved during incremental deploy and making incremental deploy a more deterministic operation. Removing a shard server (e.g., due to failure or scaling down) can be done similarly in both options.

Resharding

Splitting and Merging Replication Units

Figure 12:
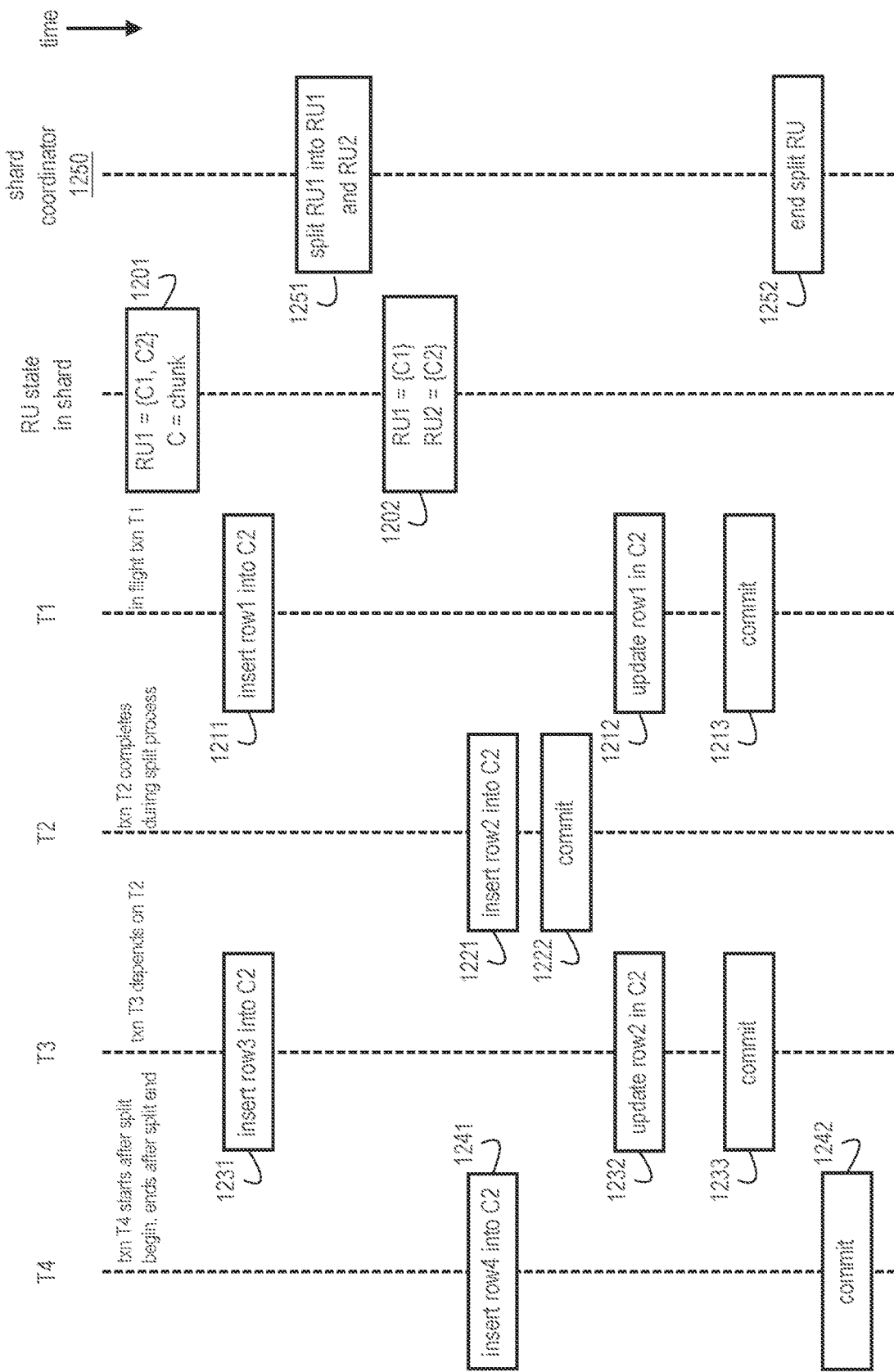
FIG. 12 is a data flow diagram illustrating an example replication unit split in accordance with an illustrative embodiment.

To add a new shard server or remove a shard server (e.g., shard failure), it may be necessary to move RUs from one shard server to another or split and/or merge RUs. In accordance with an illustrative embodiment, the shard coordinator ensures that in-flight transactions during those operations are not impacted. There are several approaches for splitting an RU or merging RUs. FIG. 12 is a data flow diagram illustrating an example replication unit split in accordance with an illustrative embodiment. For simplicity, assume there are no leadership changes during an RU split. Transactions T1, T2, T3, T4 are executed on a given shard server (leader or follower) within the sharded database management system. The RU state 1201 in the shard begins as RU1={C1, C2}, where C is a chunk. That is, RU1 includes two chunks, C1 and C2.

There is an in-flight DML 1211 from transaction T1 to insert row1 into C2 and an in-flight DML 1231 from transaction T3 to insert row3 into C2. Then, the shard coordinator 1250 initiates a split operation 1251 to split RU1 into RU1 and RU2. As a result, the RU state 1202 in the shard server becomes RU1={C1}, RU2={C2}. That is, RU1 is split into RU1 containing chunk C1 and RU2 containing chunk C2.

The shard coordinator 1250 creates a new RU (RU2 in FIG. 12), which has the same set of shard servers for its replicas. The leader for the old RU is the leader for the new RU. The shard coordinator 1250 creates the new RU and enqueues a split RU begin marker into both the old RU and the new RU. The shard coordinator 1250 associates a set of chunks (C2 in FIG. 12) with the new RU. The shard coordinator 1250 sets up the replication processes for the new RU and suspends the SQL Apply processes for the new RU.

The shard coordinator 1250 waits for transactions running concurrently with the RU split to finish. In the example shown in FIG. 12, transactions T1 and T3 are in-flight when the split is initiated. Transaction T3 depends on transaction T2, and transaction T2 completes during the split process. As a defensive measure, the shard coordinator 1250 enqueues the old values of all scalar columns for updates and deletes during the RU split process. Shard coordinator 1250 does the same for the RU merge process.

The remaining changes for in-flight transactions (e.g., T1 and T3) after the start of the RU split will be enqueued to the existing RU. Thus, the DML 1212 and commit 1213 for T1 and the DML 1232 and commit 1233 are enqueued to the existing RU1. Transactions that start after the split (e.g., T2 and T4) will be enqueued into both the old and new RUs. Thus, DML 1221 and commit for T2 and DML 1241 and commit for T4 are enqueued to both RU1 and RU2. Once all in-flight transactions have completed, the shard coordinator 1250 enqueues a split RU end marker into both the old RU and the new RU, thus performing the end split RU 1252.

If a transaction (e.g., T1, T3) starts before the split command is initiated, the SQL Apply for the old RU executes this transaction. These transactions are considered in-flight. For transactions (e.g., T2, T4) that start after the RU split operation is initiated, if the transaction (e.g., T2) ends before the split command completes, then the SQL Apply for the old RU executes this transaction, and the SQL Apply for the new RU ignores this transaction. If the transaction ends after the RU split operation completes, then the SQL Apply for the new RU executes this transaction, and the SQL Apply for the old RU ignores this transaction.

When the SQL Apply in a follower for the old RU receives the split RU end marker enqueued above, it would suspend the SQL Apply process for the new RU. Long-running transactions would lead to longer suspension of the SQL Apply processes.

After the RU split process, the shard coordinator enables regular consensus protocol-based leadership change.

The RU split process described above with reference to FIG. 12 can be generalized to split one RU into multiple RUs instead of just two.

Adding a New Shard

When new shard servers are added, if the user requests chunk rebalancing, new RUs can be created on the new shards via a Relocate chunk command and Move RU command. There are many options to rebalance, such as the following:

1. Populate the new shard server with the average number of chunks per shard server in each replication group. This would yield a balanced system at the expense of a one-time hit of larger amounts of data movement among the followers.
2. Restrict the "donor" shards to a small, fixed number when populating the new shard server. This is to minimize data movement. However, it will lead to a less well-balanced system.

Moving a Replication Unit to a New Follower

Moving an RU from one follower to another follower may be performed as follows:

1. Stop SQL Apply at old follower and record apply metadata (low watermark and oldest log index).
2. Perform below two tasks in parallel:
   a. Instantiate the new follower. Copy the relevant data (apply metadata, user data) using old follower, e.g., TTS, export/import. Instantiate user data and create new apply in the new follower with the low watermark and oldest log index.
   b. Copy replication logs (starting with oldest log index) at the old follower and transport to new follower.
3. Make new follower as non-voting member. Start applying to apply replication logs starting from the old log index.
4. Make new follower as a voting member when the new follower almost catches up.
5. Remove the old follower from the replication unit.

Reinstate a Replication Unit

The reasons for reinstating an RU include creation of an additional replica on a new shard server to increase replication factor, replacement of a replication unit on a "fallen" shard server with a replication unit on another shard server, rebuilding a replication unit on a shard server to recover from data/log divergence, and rebuilding an outdated replication unit after it was down for a long time to allow them to catch up.

The high-level steps for reinstating an RU are as follows:

1. Remove RU from target shard server if it is there.
2. Copy RU.
3. Bring back RU to R/W state on source database.
4. Update peers and catalog (needed only when doing add/replace).
5. Start RU process group on target shard server.

Recovery

In accordance with an illustrative embodiment, if a shard server fails and there is a new spare shard, target shards are selected, typically hosting a follower, and all the chunks and replication logs for the relevant replication units are copied to the new shard. If there is no new spare shard server and there is available capacity in the existing shard servers, all the chunks for the relevant replication units are redistributed to those shards, maintaining the replication factor. For simplicity, new transactions are not allowed to span a term; however, commit and rollback records can be generated in a different term in the new leader.

Consistency between Leader Transaction Commits and Replication Log Synchronous Replication To ensure the consistency between the leader transaction commits and the replication log synchronous replication, two embodiments are described below.

In one embodiment, the leader prepares the local transaction for commit and marks the transaction as in-doubt first, and then sends the commit LCR to its followers. Upon receiving consensus of the commit LCR, the leader commits the local transaction. Upon failure of the leader shard server, if the failed leader becomes a follower and there is a consensus for this commit LCR based on the replication log, the in-doubt state of the local transaction in the failed leader can be committed. Otherwise, the transaction must be rolled back in the failed leader. Each follower receives the commit LCR but does not perform the commit on its copy of the replication unit until the follower receives a commit log index from the leader that is equal to or greater than the log index of the commit LCR, thus indicating that the commit LCR has been persisted by the other followers.

In an alternative embodiment, before committing a local transaction, the leader sends a pre-commit LCR to its followers. Upon receiving consensus for the pre-commit LCR, the leader commits the local transaction and sends a post-commit LCR to its followers. Upon failure of the leader shard server and the failed leader becoming a follower, if there is a consensus for the pre-commit LCR based on the replication log, then the local transaction can be committed in the failed leader. If the local transaction in the failed leader is rolled back, the transaction can be replayed to the failed leader based on the replication log. If the transaction fails (e.g., the user session crashes) after sending the pre-commit LCR, if the shard server remains the leader, the process monitor in the database generates and sends rollback records to its followers.

Transaction Recovery

A sequence of LCRs for a transaction T1 is as follows:

$$T_F^1 \rightarrow T_D^1 \rightarrow \ldots \rightarrow T_D^1 \rightarrow T_{pre}^1 \rightarrow T_{post}^1$$

where $T_D$ is a DML LCR, $T_F$ is the first LCR of the transaction, which could be a DML LCR, $T_{pre}$ is a pre-commit LCR (waiting for consensus), and $T_{post}$ is a post-commit LCR. At any point prior to the post-commit LCR, a transaction can be rolled back resulting in $T_{RBK}$, which is a rollback LCR. The purpose of the pre-commit LCR $T_{pre}^1$ is to allow the leader to receive a consensus prior to committing the transaction locally.

The leader does not wait for consensus on the post-commit LCR $T_{post}^1$ before returning to the client. The commit of the transaction at the leader occurs between the pre-commit LCR and the post-commit LCR. On each follower, the commit occurs after receiving the post-commit LCR. A follower does not commit the transaction to its copy of the replication unit after receiving the pre-commit LCR, because the follower does not know if there was consensus for the pre-commit LCR. In fact, the follower could receive a rollback LCR after a pre-commit LCR. If a follower receives a post-commit LCR, then the follower knows that there was consensus for the pre-commit LCR and the leader committed the transaction.

If the leader fails prior to sending the post-commit LCR and there is an election for leadership, then the new leader will be the follower that has the longest replication log. There are several scenarios that could occur. One scenario is that the new leader has LCRs for the transaction not including the pre-commit LCR or the post-commit LCR. In this case, the new leader does not know if there were other DML LCRs for changes made by the old leader and acknowledged to the user/client. Thus, the new leader would roll back the transaction and issue a rollback LCR.

Another scenario is that the new leader has LCRs for the transaction including the pre-commit LCR and the post-commit LCR. This transaction must be committed. Therefore, the new leader commits the transaction.

Another scenario is that the new leader has LCRs for the transaction including the pre-commit LCR but not the post-commit LCR. The new leader cannot assume that the pre-commit LCR received consensus. In accordance with an illustrative embodiment, the new leader issues a lead-sync LCR, which is a special LCR sent at the beginning of a term to synchronize the replication logs of the followers. The new leader waits for consensus on the lead-sync LCR, which indicates that a consensus number of followers have persisted all the LCRs leading up to the lead-sync LCR. In other words, a follower acknowledges the lead-sync LCR only if that follower has persisted the LCRs leading up to the lead-sync LCR. Each LCR has a log index; therefore, each follower will know if all LCRs are persisted up to and including the lead-sync LCR. A follower cannot acknowledge that the lead-sync LCR is persisted without also acknowledging that each LCR having a log index less than the lead-sync LCR has been persisted. This will ensure that for transaction T1, all followers will have the pre-commit LCR and all LCRs leading up to the pre-commit LCR. The new leader can then commit the transaction T1 to its copy of the replication unit because the new leader now knows there is consensus for the pre-commit LCR. The new leader would then send a post-commit LCR to its followers.

Consider the following sequence of LCRs in the replication log of the new leader:

$$T_F^1\{50\} \ldots T_F^2\{150\} \ldots T_{pre}^1\{250\} \ldots$$
$$T_{pre}^2\{500\}\text{LEADSYNC}\{501\}$$

If the new leader receives consensus on the lead-sync LCR with the log index of 501, then the new leader knows that a consensus number of followers have persisted the LCRs having log index up to 500. The new leader can commit both transactions T1 and T2. The new leader will generate the following LCRs: $T_{post}^1\{502\}$ and $T_{post}^2\{503\}$.

Figure 13:
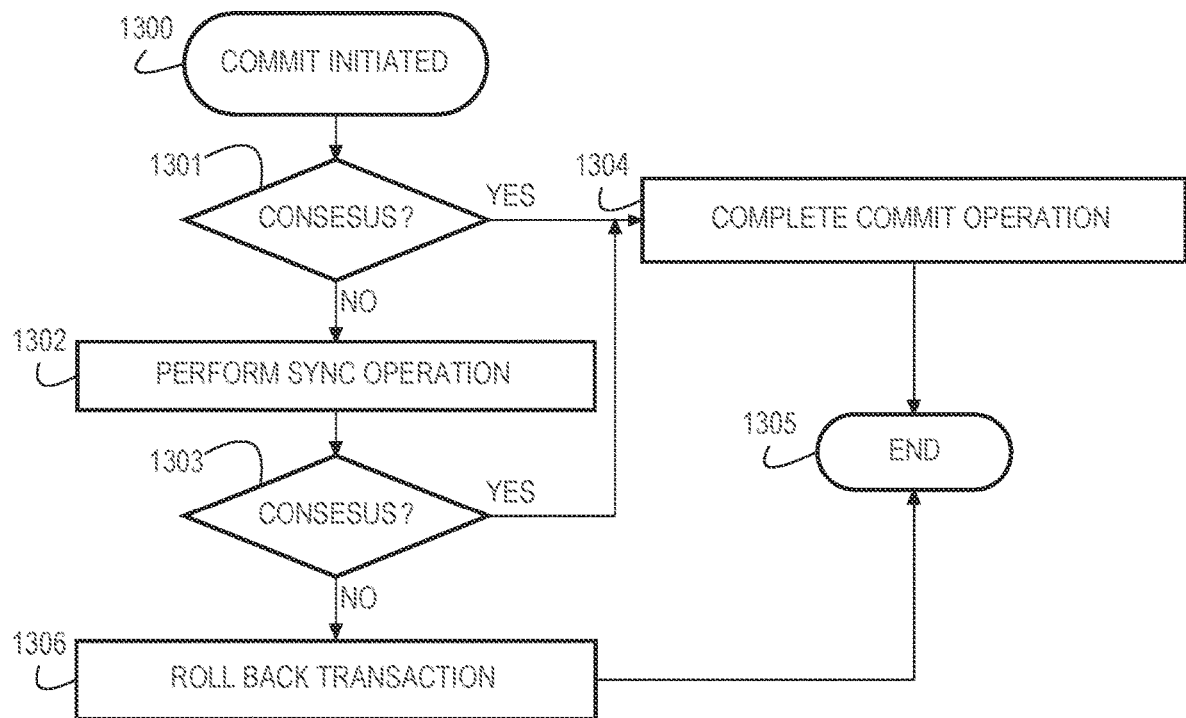
FIG. 13 is a flowchart illustrating operation of new leader shard server taking over a replication unit when there is a commit initiated in the replication log in accordance with an illustrative embodiment.

FIG. 13 is a flowchart illustrating operation of new leader shard server taking over a replication unit when there is a commit initiated in the replication log in accordance with an illustrative embodiment. Operation begins when there is a commit initiated for a transaction in the replication log (block 1301). The leader shard server determines whether there is a consensus for the transaction commit (block 1301). The leader shard server determines that there is consensus for the transaction if there is a post-commit LCR in the replication log for the transaction. If there is no consensus for the transaction (block 1301:NO), then the leader shard server performs a lead-sync operation by generating a lead-sync LCR and propagating the lead-sync LCR to its followers (block 1302).

In response to a follower receiving the lead-sync LCR, the follower will request every LCR in the replication log up to the log index of the lead-sync LCR. If the follower successfully receives every LCR in the replication log up to the log index of the lead-sync LCR and persists the LCRs in its replication log, then the follower returns an acknowledgement specifying the log index of the lead-sync LCR. The leader shard server then knows that the follower has acknowledged every LCR in the replication log up to and including the lead-sync LCR.

The leader shard server then determines whether consensus is received for the lead-sync LCR (block 1303). The leader shard server determines that there is consensus for the transaction if there is a consensus number of followers acknowledge LCRs with log index up to and including the lead-sync LCR, thus including the pre-commit LCR for the transaction. If there is consensus for the lead-sync LCR (block 1301:YES or block 1303:YES), then the leader shard server completes the commit operation (block 1304), and operation ends (block 1305). In one embodiment, completing the commit operation includes generating a post-commit LCR and propagating the post-commit LCR to its followers.

If consensus is not received for the lead-sync LCR, the system does not start recovery and the leader does not generate any log records. The system starts recovery only when the consensus on the lead-sync LCR has been reached, hence effectively guaranteeing the consensus on every LCR prior to the lead-sync LCR. If there is no consensus for the lead-sync LCR (block 1303:NO), then the leader shard server rolls back the transaction (block 1306). Thereafter, operation ends (block, 1305).

Replication Log Recovery

Replication log recovery is the procedure of matching the state of the replication log with the state of the database transactions by recreating missing entries in the replication log and replaying or rolling back transactions.

In accordance with an illustrative embodiment, a shard server determines a recovery window defining transactions that must be recovered. The recovery window starts with the earliest transaction that has a first LCR in the replication log but no post-commit LCR. Consider the following sequence of LCRs in the replication log of the follower:

$$T_F^4\{50\} \ldots T_F^1\{100\} \ldots T_D^4\{150\} \ldots T_F^2\{200\} \ldots T_{post}^4\{250\} \ldots T_{post}^2\{500\} \ldots T_F^5\{600\} \ldots T_F^3\{700\} \ldots T_{pre}^1\{950\} \ldots T_{rbk}^5\{970\} \ldots \text{LEADSYNC}\{1001\}$$

Transaction T4 reached post-commit in the replication log; therefore, T4 does not need to be recovered, because a post-commit LCR for T4 indicates that the commit of T4 received consensus. The earliest transaction that has a first LCR but no post-commit LCR is transaction T1 at log index 100. Therefore, the follower must recover the replication log starting with log index 100 up to log index 1001 (the lead-sync LCR). The recovery window is shown in bold. If the shard failed after receiving consensus for the pre-commit LCR but before generating the post-commit LCR, then there is not enough information in the replication log to conclude the fate of the transaction in the failed shard. The approach of the illustrative embodiment is to have the database resolve this. If the transaction was rolled back, then the transaction is replayed; otherwise, the transaction will not be replayed against the database.

Transaction T1 requires post/replay/commit. Transaction T2 does not need to be processed, because transaction T2 was locally. Transaction T3 requires rollback and a rollback LCR, because T3 did not reach the pre-commit LCR in the replication log. Transaction T4 does not need to be processed, because the first LCR of T4 is outside the recovery window. Transaction T5 does not need to be processed, because T5 has been rolled back. Therefore, the follower can ignore transactions T2, T4, and T5 during recovery.

If the database fails in the middle of a commit, then when the database restarts, there will be an election for leadership. If the old leader becomes a follower, because at least one follower had the pre-commit LCR, then there is a question of what happens to the transaction in the old leader. Because the database failed during the commit, the user will have received an error. In accordance with an embodiment, the transaction will be replayed.

Figure 14:
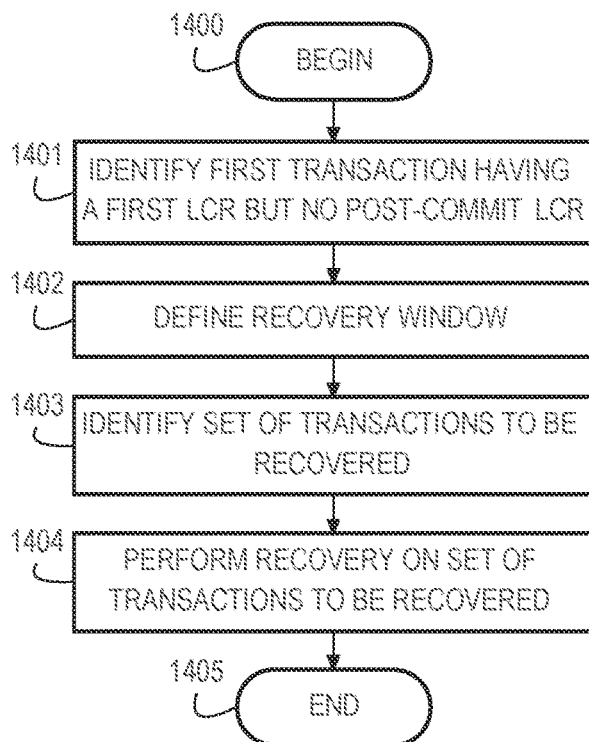
FIG. 14 is a flowchart illustrating operation of a shard server performing replication log recovery in accordance with an illustrative embodiment.

FIG. 14 is a flowchart illustrating operation of a shard server performing replication log recovery in accordance with an illustrative embodiment. Operation begins on a shard server when recovering from a failure (block 1400). The shard server identifies a first transaction in the replication log having a first LCR but no post-commit LCR (block 1401). The shard server defines the recovery window as described above (block 1402). The shard server then identifies a set of transactions to be recovered (block 1403). As described above, the shard server identifies transactions having LCRs within the recovery window that can be ignored during recovery. The shard server then performs recovery on the identified set of transactions to be recovered (block 1404). Thereafter, operation ends (block 1405).

DDL Execution without Global Barrier

In the consensus protocol-based replication approach for sharded database of the illustrative embodiments, Data Description Language (DDL) operations are executed outside the consensus protocol, i.e., DDLs are not part of the DML replication stream. This contrasts with a typical database replication.

For a given table family in a sharded database management system (SDBMS), each shard contains the same schema definitions. DDL operations in an SDBMS are issued on the Global Data Service (GDS) catalog, which propagates the DDLs to each shard. The consensus protocol-based replication approach of the illustrative embodiments only replicates DMLs asynchronously. Hence, there may be in-flight transactions in the replication pipeline that may: a) lag schema definition in a follower when the DDL Is executed in the follower first for the replication unit, or b) be ahead of the schema definition in a follower when the DDL is executed in the leader first for the replication unit.

A DDL is classified as a barrier DDL or a non-barrier DDL. Barrier DDLs do not allow in-flight DMLs, e.g., ALTER TABLE RENAME COLUMN. The SDB is quiesced, the DDL is executed synchronously against all available shards, and DMLs are allowed after DDL execution. Non-barrier DDLs allow in-flight DMLs, e.g., CREATE SYNONYM. There are two types of non-barrier DDLs: DDLs that do not require any synchronization with in-flight DMLs, e.g., CREATE SYNONYM, and DDLs that require synchronization of delayed user DMLs in the replication streams and the DDL executions. Certain in-flight DMLs are still allowed, e.g., ALTER TABLE ADD column with default values.

To handle non-barrier DDLs that require synchronization, the start and end of a non-barrier DDL must be demarcated for SQL Apply and inline triggers to enter a special mode. In an easier case, if the DDL is already executed at the leader but not at a follower, SQL Apply tries to replicate DMLs safely as much as possible, e.g., for a drop column DDL with a default value for the dropped column, SQL Apply can ignore this column. Alternatively, the leader filters out this column. SQL Apply stops when it hits an error. When the DDL is executed at the follower, the SQL Apply can be restarted. The leader can raise an error if a DML may stop the SQL Apply, e.g., alter table add column with default value, an insert with non-default value for that column.

In a harder case, the DDL is already executed at a follower but not at the leader. In this resilient handling mode, the SQL Apply continues to apply, e.g., for a drop column, the SQL Apply can ignore this column in the LCR. For an add column with default value, because the leader does not have this new column yet, the SQL Apply will not include this column in all replicated DMLs.

When a shard is down during DDL execution, it is not necessary to re-execute the DDLs when the shard is available. DDL execution must be coordinated with the replication of in-flight transactions in the replication log.

Disaster Recovery

Users can place replicas in different geographic regions, e.g., two replicas in one region and another replica in a different region. This allows the two local replicas as a quorum for steady workload and the remote replica as backup for disaster recovery. When disasters happen, users may need to reconfigure the consensus protocol-based replication in the remote region.

Cross Replication Unit Transaction Support

Any transaction spanning chunks will be initiated from the shard coordinator, which acts as the distributed transaction coordinator (DTC). The DTC executes a typical two-phase commit protocol among the leaders of all relevant replication units. The leader for a relevant replication unit must propagate sufficient information about this distributed transaction (e.g., global transaction ID, local transaction ID) to its followers and obtain consensus in the prepare commit phase from its followers before informing its readiness to commit to the DTC. The DTC can only commit after receiving ready-to-commit from all relevant RU leaders. The DTC is not aware of the presence of followers. If there is a failover in one replication unit and the new leader has the prepare-to-commit record, but not the final commit or rollback for a transaction, the new leader of the replication unit must contact the DTC to find out the fate of such a distributed transaction. With the two-phase commit protocol, distributed transactions incur a larger delay in transaction response time: one more network roundtrip. Note that the replication of a distributed transaction branch is asynchronous and is not part of the original distributed transaction. In a typical sharded deployment, it is assumed that most transactions are within the same chunk, hence avoiding the two-phase commit protocol.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, a branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., .class file).

A database object may have an attribute that is a primary key. A primary key contains primary key values. A primary key value uniquely identifies a record among the records in the database object. For example, a database table may include a column that is a primary key. Each row in the database table holds a primary key value that uniquely identifies the row among the rows in the database table.

A database object may have an attribute that is a foreign key of a primary key of another database object. A foreign key of a primary key contains primary key values of the primary key. Thus, a foreign key value in the foreign key uniquely identifies a record in the respective database object of the primary key.

A foreign key constraint based on a primary key may be defined for a foreign key. A DBMS ensures that any value in the foreign key exists in the primary key. A foreign key need not be defined for a foreign key. Instead, a foreign key relationship may be defined for the foreign key. Applications that populate the foreign key are configured to ensure that foreign key values in the foreign key exist in the respective primary. An application may maintain a foreign key in this way even when no foreign relationship is defined for the foreign key.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
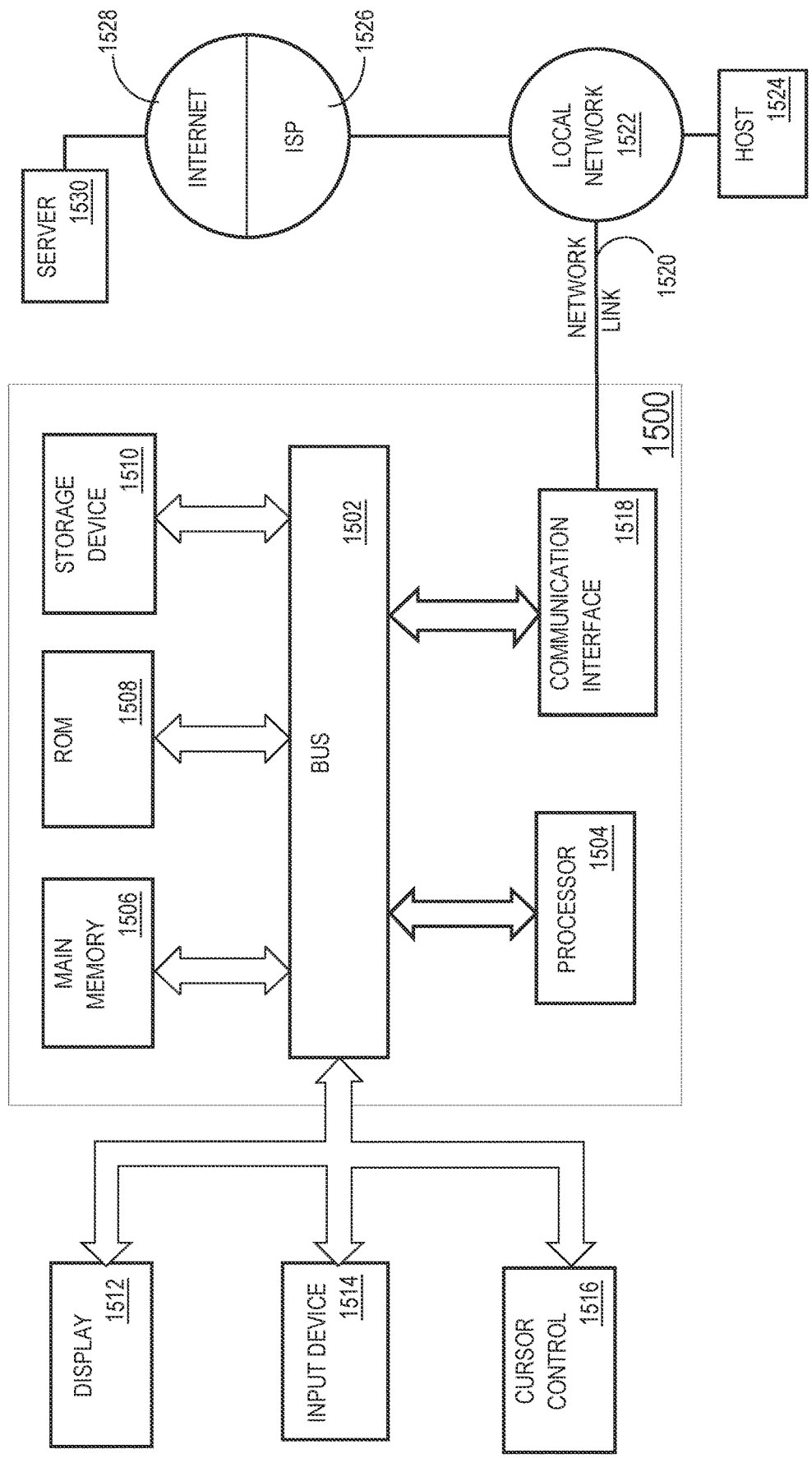
FIG. 15 is a block diagram that illustrates a computer system upon which an embodiment of the invention may be implemented.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general-purpose microprocessor.

Computer system 1500 also includes a main memory 1506, such as a random-access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk, optical disk, or solid-state drive is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1510. Volatile media includes dynamic memory, such as main memory 1506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid-state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic, or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world-wide packet data communication network now commonly referred to as the "Internet" 1528. Local network 1522 and Internet 1528 both use electrical, electromagnetic, or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

Software Overview

Figure 16:
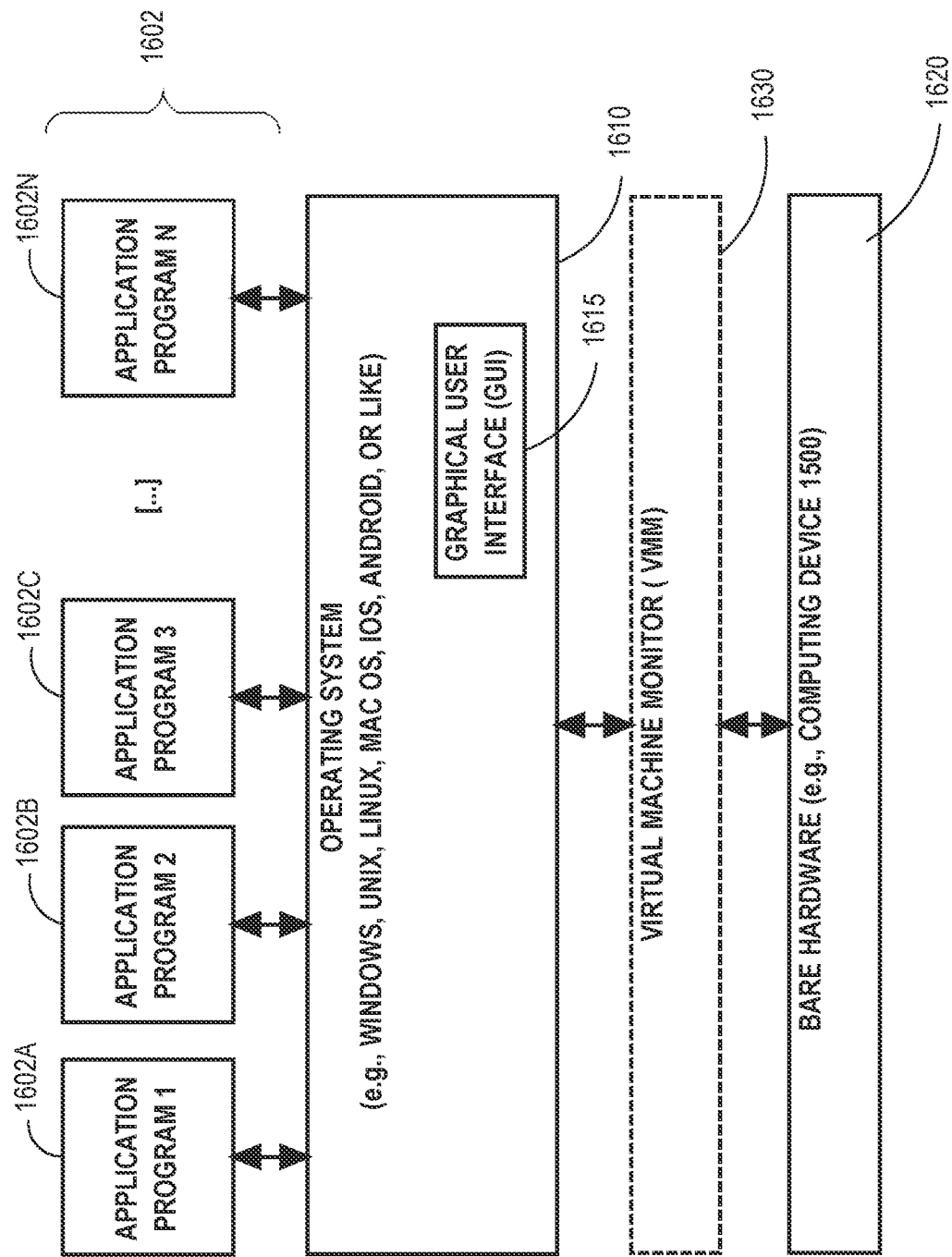
FIG. 16 is a block diagram of a basic software system that may be employed for controlling the operation of computer system.

FIG. 16 is a block diagram of a basic software system 1600 that may be employed for controlling the operation of computer system 1600. Software system 1600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1600 is provided for directing the operation of computer system 1500. Software system 1600, which may be stored in system memory (RAM) 1506 and on fixed storage (e.g., hard disk or flash memory) 1510, includes a kernel or operating system (OS) 1610.

The OS 1610 manages low-level aspects of computer operation, including managing execution of processes, memory allocation, file input and output (I/O), and device I/O. One or more application programs, represented as 1602A, 1602B, 1602C . . . 1602N, may be "loaded" (e.g., transferred from fixed storage 1510 into memory 1506) for execution by the system 1600. The applications or other software intended for use on computer system 1500 may also be stored as a set of downloadable computer-executable instructions, for example, for downloading and installation from an Internet location (e.g., a Web server, an app store, or other online service).

Software system 1600 includes a graphical user interface (GUI) 1615, for receiving user commands and data in a graphical (e.g., "point-and-click" or "touch gesture") fashion. These inputs, in turn, may be acted upon by the system 1600 in accordance with instructions from operating system 1610 and/or application(s) 1602. The GUI 1615 also serves to display the results of operation from the OS 1610 and application(s) 1602, whereupon the user may supply additional inputs or terminate the session (e.g., log off).

OS 1610 can execute directly on the bare hardware 1620 (e.g., processor(s) 1504) of computer system 1500. Alternatively, a hypervisor or virtual machine monitor (VMM) 1630 may be interposed between the bare hardware 1620 and the OS 1610. In this configuration, VMM 1630 acts as a software "cushion" or virtualization layer between the OS 1610 and the bare hardware 1620 of the computer system 1500.

VMM 1630 instantiates and runs one or more virtual machine instances ("guest machines"). Each guest machine comprises a "guest" operating system, such as OS 1610, and one or more applications, such as application(s) 1602, designed to execute on the guest operating system. The VMM 1630 presents the guest operating systems with a virtual operating platform and manages the execution of the guest operating systems.

In some instances, the VMM 1630 may allow a guest operating system to run as if it is running on the bare hardware 1620 of computer system 1500 directly. In these instances, the same version of the guest operating system configured to execute on the bare hardware 1620 directly may also execute on VMM 1630 without modification or reconfiguration. In other words, VMM 1630 may provide full hardware and CPU virtualization to a guest operating system in some instances.

In other instances, a guest operating system may be specially designed or configured to execute on VMM 1630 for efficiency. In these instances, the guest operating system is "aware" that it executes on a virtual machine monitor. In other words, VMM 1630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
assigning a plurality of chunks of a database to a plurality of database shard servers, wherein:
said database is divided into said plurality of chunks;
said plurality of chunks are grouped into a plurality of replication units;
each database shard server within the plurality of database shard servers is a leader shard for a first subset of the plurality of replication units and a follower shard for a second subset of the plurality of replication units, and
the plurality of database shard servers are organized in a plurality of rings;
in response to a leader shard of a given replication unit performing a data manipulation language (DML) operation on the given replication unit, replicating the DML operation to the follower shards of the given replication unit; and
in response to a barrier schema change operation affecting a given replication unit, quiescing workload for a ring of database shard servers servicing the given replication unit without quiescing workload for other rings,
wherein the method is performed by one or more computing devices.

2. The method of claim 1, wherein:
each replication unit within the plurality of replication units has an associated replication factor (RF) equal to a number of copies of the replication unit stored on the plurality of database shard servers, and
each of the one or more rings has a size equal to the RF in an initial configuration.

3. The method of claim 1, wherein:
each replication unit within the plurality of replication units has an associated replication factor (RF) equal to a number of copies of the replication unit stored on the plurality of database shard servers,
each replication unit within the plurality of replication units has an associated distribution factor (DF) equal to a number of database shard servers configured to take over user workload from a failed database shard server, and
the method further comprises:
adding one or more new database shard servers to the plurality of database shard servers; and
regrouping and reassigning the plurality of chunks to the plurality of database shard servers while maintaining the replication factor and the distribution factor.

4. The method of claim 1, further comprising:
adding one or more new database shard servers to the plurality of database shard servers; and
regrouping and reassigning the plurality of chunks to the plurality of database shard servers,
wherein regrouping and reassigning the plurality of chunks comprises:
reassigning chunks from the plurality of replication units to create a plurality of new replication units; and
assigning the new replication units to the one or more new database shard servers.

5. The method of claim 1, further comprising:
adding one or more new database shard servers to the plurality of database shard servers; and
regrouping and reassigning the plurality of chunks to the plurality of database shard servers,
wherein;
each replication unit within the plurality of replication units has an associated replication factor (RF) equal to a number of copies of the replication unit stored on the plurality of database shard servers, and
regrouping and reassigning the plurality of chunks comprises:
in response to adding the one or more new database shard servers to the plurality of database shard servers resulting in a number of the plurality of database shard servers being equal to a multiple of the replication factor, adding a ring to the one or more rings.

6. The method of claim 1, wherein
each replication unit within the plurality of replication units has an associated replication factor (RF) equal to a number of copies of the replication unit stored on the plurality of database shard servers,
each replication unit within the plurality of replication units has an associated distribution factor (DF) equal to a number of database shard servers configured to take over user workload from a failed database shard server, and
the method further comprises:
removing one or more new database shard servers from the plurality of database shard servers; and
regrouping and reassigning the plurality of chunks to the plurality of database shard servers while maintaining the replication factor and the distribution factor.

7. The method of claim 1, further comprising:
in response to failure of a database shard server within a given ring, adding a new database shard server to the plurality of database shard servers and assigning the new database shard server to the given ring.

8. The method of claim 1, further comprising:
initiating splitting an existing replication unit containing a set of chunks into a first new replication unit containing a first subset of the set of chunks and a second new replication unit containing a second subset of the set of chunks;
enqueueing in-flight transactions for the existing replication unit into the existing replication unit;
enqueueing transactions started after initiating splitting the existing replication unit into the first new replication unit and the second new replication unit; and
in response to the in-flight transactions completing, enqueueing a split end marker into the first new replication unit and the second new replication unit.

9. The method of claim 1, further comprising:
initiating merging a first existing replication unit containing a first set of chunks and a second existing replication unit containing a second set of chunks into a new replication unit containing the first set of chunks and the second set of chunks;
enqueueing in-flight transactions for the first existing replication unit into the first existing replication unit;
enqueueing in-flight transactions for the second existing replication unit into the second existing replication unit;
enqueueing transactions started after initiating merging the first existing replication unit and the second existing replication unit into the new replication unit; and
in response to the in-flight transactions for the first existing replication unit and the second existing replication unit completing, enqueueing a merge end marker into the new replication unit.

10. The method of claim 1, further comprising:
storing a routing map for each given replication unit, wherein the routing map maintains a read-only routing state for one or more follower shards and maintains a read-write routing state for one or more leader shards.

11. The method of claim 10, wherein:
the routing maps are cached outside the database, and
the method further comprises invalidating and reloading the cached routing map for a particular replication unit in response to a leadership change of the particular replication unit.

12. One or more non-transitory storage media storing instructions which, when executed by one or more computing devices, cause:
dividing a database into a plurality of chunks;
grouping sets of the plurality of chunks into a plurality of replication units;
assigning the plurality of chunks to a plurality of database shard servers, wherein:
each database shard server within the plurality of database shard servers is a leader shard for a first subset of the plurality of replication units and a follower shard for a second subset of the plurality of replication units, and
the plurality of database shard servers is organized in a plurality of rings;
in response to a leader shard of a given replication unit performing a data manipulation language (DML) operation on the given replication unit, replicating the DML operation to the follower shards of the given replication unit; and
in response to a barrier schema change operation affecting a given replication unit, quiescing workload for a ring of database shard servers servicing the given replication unit without quiescing workload for other rings.

13. The one or more non-transitory storage media of claim 12, wherein:
each replication unit within the plurality of replication units has an associated replication factor (RF) equal to a number of copies of the replication unit stored on the plurality of database shard servers, and
each of the one or more rings has a size equal to the RF in an initial configuration.

14. The one or more non-transitory storage media of claim 12,
wherein:
each replication unit within the plurality of replication units has an associated replication factor (RF) equal to a number of copies of the replication unit stored on the plurality of database shard servers,
each replication unit within the plurality of replication units has an associated distribution factor (DF) equal to a number of database shard servers configured to take over user workload from a failed database shard server, and
the instructions, when executed by the one or more computing devices, further cause:
adding one or more new database shard servers to the plurality of database shard servers; and
regrouping and reassigning the plurality of chunks to the plurality of database shard servers while maintaining the replication factor and the distribution factor.

15. The one or more non-transitory storage media of claim 12,
wherein the instructions, when executed by the one or more computing devices, further cause:
adding one or more new database shard servers to the plurality of database shard servers;
reassigning chunks from the plurality of replication units to create a plurality of new replication units; and
assigning the new replication units to the one or more new database shard servers.

16. The one or more non-transitory storage media of claim 12,
wherein:
each replication unit within the plurality of replication units has an associated replication factor (RF) equal to a number of copies of the replication unit stored on the plurality of database shard servers, and
the instructions, when executed by the one or more computing devices, further cause:
adding one or more new database shard servers to the plurality of database shard servers; and
regrouping and reassigning the plurality of chunks to the plurality of database shard servers,
in response to adding the one or more new database shard servers to the plurality of database shard servers resulting in a number of the plurality of database shard servers being equal to a multiple of the replication factor, adding a ring to the one or more rings.

17. The one or more non-transitory storage media of claim 12,
wherein:
each replication unit within the plurality of replication units has an associated replication factor (RF) equal to a number of copies of the replication unit stored on the plurality of database shard servers,
each replication unit within the plurality of replication units has an associated distribution factor (DF) equal to a number of database shard servers configured to take over user workload from a failed database shard server, and
the instructions, when executed by the one or more computing devices, further cause:
removing one or more new database shard servers from the plurality of database shard servers; and
regrouping and reassigning the plurality of chunks to the plurality of database shard servers while maintaining the replication factor and the distribution factor.

18. The one or more non-transitory storage media of claim 12, the instructions, when executed by the one or more computing devices, further cause:
in response to failure of a database shard server within a given ring, adding a new database shard server to the plurality of database shard servers and assigning the new database shard server to the given ring.

19. The one or more non-transitory storage media of claim 12, wherein the instructions,
when executed by the one or more computing devices, further cause:
initiating splitting an existing replication unit containing a set of chunks into a first new replication unit containing a first subset of the set of chunks and a second new replication unit containing a second subset of the set of chunks;
enqueueing in-flight transactions for the existing replication unit into the existing replication unit;
enqueueing transactions started after initiating splitting the existing replication unit into the first new replication unit and the second new replication unit; and
in response to the in-flight transactions completing, enqueueing a split end marker into the first new replication unit and the second new replication unit.

20. The one or more non-transitory storage media of claim 12, wherein the instructions,
when executed by the one or more computing devices, further cause:
initiating merging a first existing replication unit containing a first set of chunks and a second existing replication unit containing a second set of chunks into a new replication unit containing the first set of chunks and the second set of chunks;
enqueueing in-flight transactions for the first existing replication unit into the first existing replication unit;
enqueueing in-flight transactions for the second existing replication unit into the second existing replication unit;
enqueueing transactions started after initiating merging the first existing replication unit and the second existing replication unit into the new replication unit; and
in response to the in-flight transactions for the first existing replication unit and the second existing replication unit completing, enqueueing a merge end marker into the new replication unit.

* * * * *